United States Patent [19]

Hendrickson et al.

[11] Patent Number: 5,276,678
[45] Date of Patent: Jan. 4, 1994

[54] DISTRIBUTED SWITCHING AND TELEPHONE CONFERENCING SYSTEM

[75] Inventors: Herbert C. Hendrickson; Christopher J. Stevens, both of Honolulu; Verne E. Munson, Waianae; Peter M. Onaka, Honolulu, all of Hi.

[73] Assignee: Intelect, Inc., Mililani, Hi.

[21] Appl. No.: 539,787

[22] Filed: Jun. 18, 1990

[51] Int. Cl.$^5$ .................................... H04L 11/04
[52] U.S. Cl. ............................ 370/62; 370/58.1; 370/85.1; 379/202
[58] Field of Search ............... 370/110.1, 60, 58.1, 370/85.1, 44.1, 58.2, 58.3, 85.9; 379/202, 17, 370/62; 395/425; 370/60.1–68.1, 158

[56] References Cited

U.S. PATENT DOCUMENTS

| | | | |
|---|---|---|---|
| 4,256,926 | 3/1981 | Pitroda et al. | 179/18 |
| 4,257,120 | 3/1981 | Funderburk et al. | 370/62 |
| 4,267,593 | 5/1981 | Regan et al. | 370/62 |
| 4,289,934 | 9/1981 | Ditroda et al. | 379/269 |
| 4,389,720 | 6/1983 | Baxter et al. | 370/62 |
| 4,511,969 | 4/1985 | Koenig et al. | 379/90 |
| 4,535,454 | 8/1985 | Buzzard et al. | 370/62 |
| 4,545,050 | 10/1985 | Van Baardewijk et al. | 370/62 |
| 4,589,107 | 5/1986 | Middleton et al. | 370/62 |
| 4,594,705 | 4/1986 | Yabota et al. | 370/100.1 |
| 4,606,021 | 8/1986 | Wurst | 370/60 |
| 4,627,047 | 12/1986 | Pitroda et al. | 370/58 |
| 4,627,050 | 12/1986 | Johnson et al. | 370/85 |
| 4,792,942 | 12/1988 | Osato | 370/62 |
| 4,794,591 | 12/1988 | Hoff et al. | 370/62 |
| 4,796,293 | 1/1989 | Blinken et al. | 379/202 |
| 4,797,877 | 1/1989 | Pope et al. | 370/62 |
| 4,829,513 | 5/1989 | Rosen | 370/62 |
| 4,878,082 | 11/1988 | Delaney et al. | 370/85.1 |
| 4,901,308 | 2/1990 | Deschaine | 370/62 |
| 4,916,692 | 4/1990 | Clarke et al. | 370/85.1 |
| 4,933,846 | 6/1990 | Humphrey et al. | 370/85.1 |
| 4,953,159 | 8/1990 | Hayden et al. | 370/62 |
| 5,034,947 | 7/1991 | Epps | 370/62 |
| 5,070,499 | 12/1991 | Maher et al. | 370/85.7 |
| 5,088,091 | 2/1992 | Schroeder et al. | 370/85.13 |
| 5,115,499 | 5/1992 | Stiffler et al. | 395/425 |

*Primary Examiner*—Douglas W. Olms
*Assistant Examiner*—Dang Ton
*Attorney, Agent, or Firm*—Richards, Medlock & Andrews

[57] ABSTRACT

A communication system having full call processing capabilities in the user ports, each port being connected to a TDM collection bus and a TDM distribution bus. A bus controller terminates the collection bus on which voice words are deposited in time slots by the respective user ports, the voice words being realigned and transmitted by the bus controller on the TDM distribution bus. Each user port is assigned a time slot and can thus communicated simultaneously with one or more other user ports, such as during a two-way telephone conversation or a multiple party conference call. A memory in each user port combines plural voice words obtained from respective TDM time slots of conference participants, and combines such voice words into a composite signal representative of all the other conferees. The conference circuit of each user port combines the voice words of all the other participating ports over a frame period, except its own voice word, and thus the composite voice word of each user port is different.

86 Claims, 7 Drawing Sheets

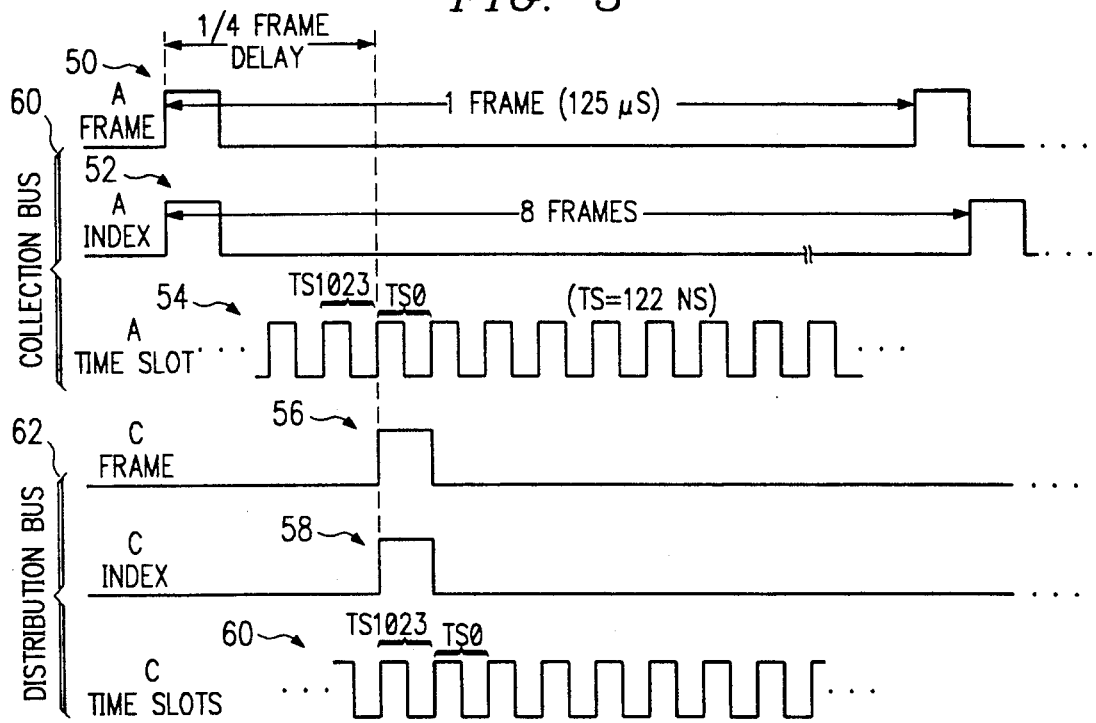

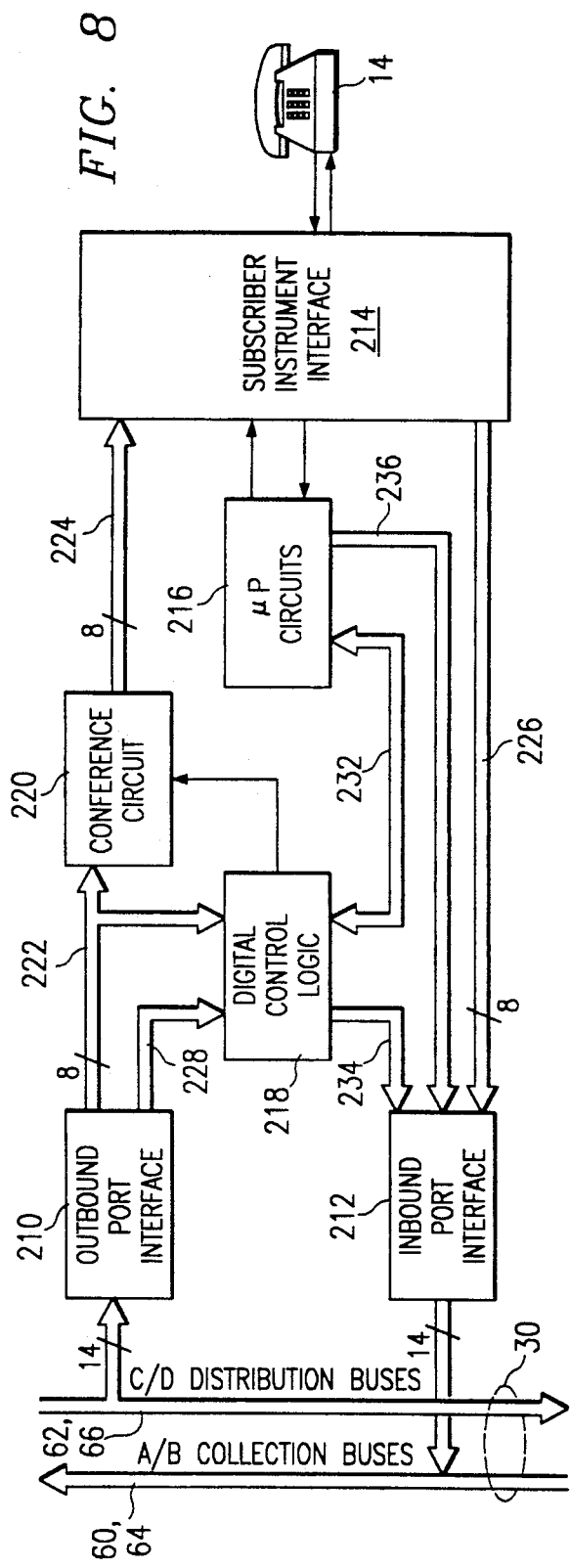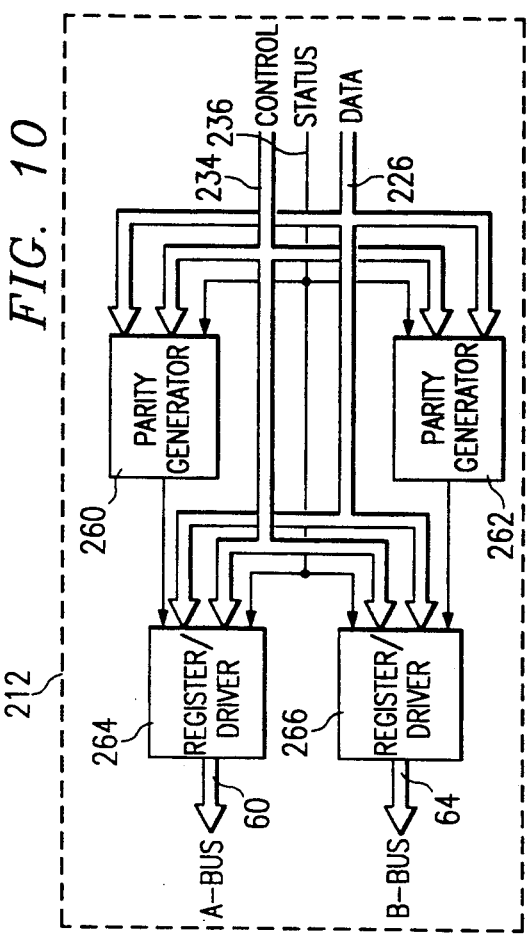

DISTRIBUTED SWITCHING AND TELEPHONE CONFERENCING SYSTEM

TECHNICAL FIELD OF THE INVENTION

The present invention relates in general to telecommunication methods and switching equipment, and more particularly to systems employing time division multiplex techniques and distributed call processing.

BACKGROUND OF THE INVENTION

In recent decades, the field of telecommunications has experienced a significant growth, due primarily to the development of high level digital circuit integration and microprocessors. While microprocessors and associated circuits may not be well adapted for providing the processing capability in large toll or central office switching systems, the integrated circuit microprocessor is well adapted for use in smaller switching systems, such as private automatic branch exchange systems (PABX), key telephone systems, and other types of on premises and office communication systems.

In many office-type switching systems, call processing capabilities must be provided for carrying out the traditional functions such as initiating calls, carrying on and completing telephone calls. One sophisticated microprocessor control complex for such a telecommunications switching system is disclosed in U.S. Pat. No. 4,256,926. By employing a processor control complex, a great deal of flexibility can be provided in making available numerous features to the users of the system. In addition, an all-digital type of system can employ pulse code modulation (PCM) of the audio signals, time division multiplexing (TDM) techniques and microprocessors, all of which are readily available integrated types of circuits for constructing communication systems.

U.S. Pat. No. 4,257,119 discloses a PCM switching system adapted for carrying wide band and narrow band signals. U.S. Pat. No. 4,627,050 discloses a time division multiplex computerized branch exchange system, while U.S. Pat No. 4,627,047 discloses a telecommunication system switching system adapted for carrying both voice and data signals.

Another feature which is provided by many PABX and other types of switching systems is a conferencing capability. That is, a number of parties can be effectively bridged together so as to be able to speak and listen to each other. While conferencing was a relatively easy task when dealing with analog audio signals, the ability to bridge together a number of digital voice channels is more complex. U.S. Pat. No. 4,267,593 discloses a two-port digital conference circuit and the problems attendant with digital conferencing. A multiport conferencing circuit is disclosed in U.S. Pat. No. 4,257,120, in which numerous comparators and registers are required to determine a predominant voice sample to be distributed amongst the conferees.

In many of the foregoing telecommunication switching systems, and others, the flexibility to expand the system to accommodate additional users is limited. In other words, the growth capabilities are compromised, in that often it is necessary to purchase a system having the initial capability of servicing the number of user ports anticipated to be required in the future. The economic disadvantage of such a system is apparent. In other systems, modules can be added to the switching system as growth requirements dictate, however, certain central processing power must initially exist. The expandability of such type of systems has tradeoffs between initial cost and expansion capability.

It can be seen from the foregoing that a need exists for a communication system which is easily expandable and exhibits a high degree of universality with regard to the various modules. Another need exists for a communication system which does not have a central control complex, but rather provides call processing capability in each user port. Yet another need exists for a communication system in which conferencing is simplified, and there is not a limitation on the number of simultaneous conferences which can be carried on or the voice quality of the conference.

SUMMARY OF THE INVENTION

In accordance with the invention, a modular communication system substantially reduces or eliminates the shortcomings and disadvantages of prior telecommunication systems. According to a preferred embodiment of the invention, there is provided a unidirectional collection time division multiplex (TDM) bus and a unidirectional distribution TDM bus to which each of a number of user ports or modules are connected. Each user module is associated either with a subscriber telephone set, an operator console, a central office trunk, a radio telephone trunk or other communication facility. Each user port is assigned a dedicated time slot on the TDM buses. The user ports are adapted for placing into their respective collection bus time slots a voice word or data word which is made available to any other user port in the system. In like manner, each user port can monitor the distribution TDM bus and receive voice words or data words from the time slots of the other user ports.

Each user port is processor controlled to carry out call processing capabilities, and include directory number tables and time slot tables of all the user ports in the system so that an exchange of voice words or data words between the various time slots can be achieved to carry out communications between the user ports. Each user port has complete programming capability to provide call processing facilities distributed in each user port. Each user port is interchangeable with regard to the collection and distribution TDM buses, irrespective of whether such ports service telephone sets, consoles, trunking or other data facilities.

Timing and control of the TDM buses is accomplished by bus control circuits which provide a termination for the collection bus, and resynchronization for the distribution bus to thereby maintain frame timing of the buses throughout the system. Call processing programs, directory number tables, and other data can be downloaded to the bus controller by local or remotely located computer equipment. In like manner, the software programs and data can be downloaded from the bus controller into each of the user ports, via the TDM bus. The bus controller also has assigned thereto a time slot of the TDM buses. By distributing call processing capability with each user port, various communication services can be carried out between the individual ports without intervention by the bus controller. Should changes be necessitated in any of the programs or tables, such changes are downloaded into the bus control circuit, and then to the user modules.

The collection and distribution bus is duplicated, as is the bus controller, to provide master and standby circuits to thereby facilitate reliability of the system. TDM bus repeaters are also provided to extend the buses and maintain synchronization throughout the communication system.

Conferencing between numerous user ports is particularly advantageous with the communication system of the invention. Status information can be transmitted via the TDM buses to the other ports which are to participate in the conference. Various "hand shake" signals are exchanged between the user ports to achieve the set up of the conference, whereupon each user port thereafter transmits on the collection TDM the bus voice words generated by the respective audio inputs connected to the ports. Each port then monitors the time slots of all the other conference ports during a frame period and then produces a resultant voice word which represents the analog equivalent of the sum of the voice information input into the other ports in the conference.

The resultant voice word is produced by a circuit which effectively produces a summation of the series of voice words received during a frame period, and in the time slots of the other user ports of the conference. The conference circuit includes a memory which permanently stores the results of summations of all compressed voice words which can be produced by the user ports. The addition of either A-law or μ-law compressed voice words can be accommodated. Essentially, the summation memory has a first address input which receives the sequential voice words from the time slots of the conference ports. The output of the memory constitutes a word which is temporarily stored in an output result register, the output of which is returned as another address input to the summation memory. In the preferred form of the invention, two 8-bit addresses are appended together as an address input to the summation memory. With this arrangement, voice words picked off the appropriate time slots of the TDM bus are effectively added with subsequent voice words in a frame to be conferenced. At the end of each framing interval, each user port produces a resultant voice word which constitutes a summed sample of the other ports in the conference. The number of ports which can participate in a conference is unlimited as the memory can produce a summed result for each time slot. In addition, the resultant voice words can be derived in an uncomplicated manner.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, elements or functions throughout the views, and in which:

FIG. 2 identifies the utilization of the various bits of the parallel TDM buses with respect to the different bus cycles;

FIG. 3 is a timing diagram depicting the framing intervals of the TDM buses;

FIG. 4 identifies the functions carried out by various slots of the invention;

FIG. 8 is a block diagram of a user port according to the invention;

FIG. 9 is a detailed diagram of an outbound port interface between the user port and the TDM distribution bus.

FIG. 10 is a detailed diagram of an inbound port interface between the user port and the TDM collection bus;

DETAILED DESCRIPTION OF THE INVENTION

General

While the invention described below is particularly well adapted for use as on-premises communication equipment, the principles and concepts of the invention may be applicable to many other communication environments and utilizations. Also, those skilled in the art may find one or more features of the invention applicable to certain situations, without utilizing the other features.

Figure 1:
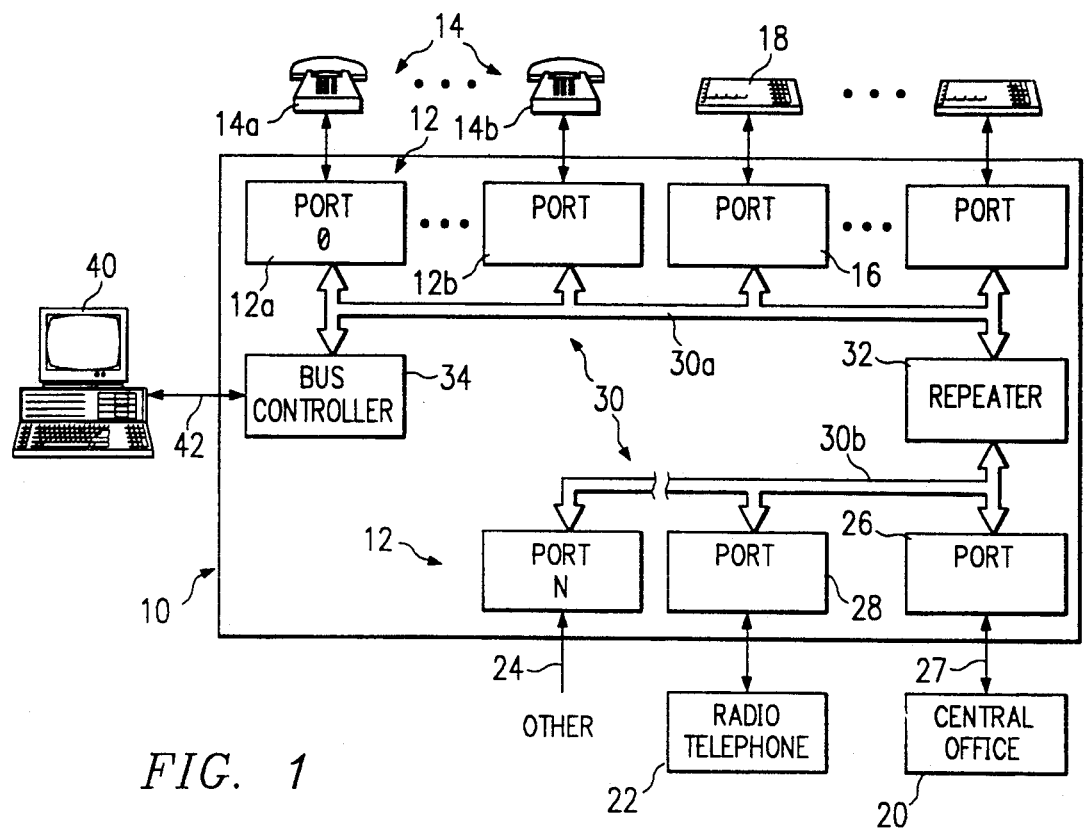
FIG. 1 is a generalized block diagram of the communications system according to the invention.

With reference now to FIG. 1, there is illustrated the major functional blocks of the communication system 10 constructed according to an embodiment of the invention. Shown are a number of user ports, generally identified as reference character 12, which provide an interface between external subscriber equipment and the system 10. The basic structure of each user port 12 is substantially similar, except for interface circuits for connecting the different types of subscriber equipment to the system 10.

For example, user ports 12a and 12b are adapted for providing an interface to a standard subscriber telephone set 14. A number of such ports can be utilized to accommodate a corresponding number of telephone sets 14. In this instance, the interface circuits in the user ports 12a–12b would be adapted for communicating audio sounds and tones and other signals to achieve conventional telephone communications. User port 16 is shown as an interface to an operator console 18. Again, the user port 16 would include interface circuits particularly adapted for communicating between the system 10 and the operator console 18. In particular, various other types of user ports can be provided for interfacing other telecommunications equipment, such as a central office 20, radio telephone equipment 22, as well as other communication facilities, shown by reference numeral 24. Various types of trunks 27 can be accommodated with the user port 26 for allowing connection of a central office switching system 20 to the communication system 10. In like manner, various other trunks or microwave facilities can be utilized to connect the radio telephone equipment 22 to the user port 28. Data channels, and integrated voice and data, such as ISDN, can be accommodated by the user ports of the invention. Generally, but not constituting a requirement, each user port is dedicated to a single subscriber set 14, console 18, trunk or other type of channel.

Each user port 12 is interconnected to the communication system 10 by a time division multiplex bus 30. As will be described in more detail below, the TDM bus 30 comprises a unidirectional collection bus and a unidirectional distribution bus. The signals carried in the various time slots of the TDM bus 30 are digital in nature, and thus can be transmitted only for limited distances. As a result, one or more TDM bus repeaters 32 can be provided to extend the bus 30a to additional similar buses 30b to service yet other user ports connected thereto. Each user port 12 has a dedicated time slot on the TDM buses 30a and 30b. In addition, each user port is processor controlled with a microprocessor in conjunction with operating software, circuits and tables to function independently of the other ports. One of the tables maintained in each user port 12 comprises a correlation between each user port and its associated time slot. In this manner, one user port can communicate audio information and data information with other ports by the interchange of data words in the respective time slots of the TDM bus 30.

The timing of the TDM bus 30 is provided by a bus controller 34. The bus controller 34 provides basic timing signals to each of the user ports 12 to synchronize each such port with regard to the time slots of the TDM bus 30. In practice, the timing signals and the voice words are carried on conductors of the TDM bus 30 so that the timing signals undergo the same delays as the voice words in the time slots. As will be described in more detail below, the bus controller 34 provides downloading capability of software and other data to each of the user port processors, provides status monitor and alarm conditions of the system, and importantly, provided resynchronization of the unidirectional TDM distribution bus with respect to the unidirectional TDM collection bus. For general non-complicated communication services, such as two-way telephone conversations, the user ports 12 can intercommunicate and establish such communications without the intervention of the bus controller 34. On the other hand, for more complicated communication services, the intervention of the bus controller 34 may be required to, for example, download conference lists, etc.

As noted above, the bus controller 34 can download software program information to each of the user ports 12. With this arrangement, the update of operating software does not require the changing of ROM-type memories in each user port 12, but rather only requires downloading of the updated information from the bus controller 34 to rewrite RAM memories in each user port 12. Only the ROM-type memories in the bus controller 34 require changing to implement new or modified versions of operating programs. The processor in bus controller 34 also maintains a data base which consists of directory tables, preset conference lists, call pickup group assignments, etc. This is maintained by the customer in a local or remote computer 40 and sent to bus controller 34 when changes are made. This data base is communicated by the bus controller 34 to the user ports 12 over the bus 30 when needed.

The generalized operation of the communication system 10 in carrying out a simple two-way telephone conversation is as follows. The bus controller 34 establishes the basic timing and framing intervals of the TDM bus 30. For example, the exemplary communication system 10 includes 1024 time slots on the TDM bus 30 for accommodating a total of 992 user ports 12, and 32 time slots used for system purposes as detailed below. The 1024 time slots occur in a framing interval of 125 microseconds, defining a sampling interval for the audio signals which are converted to digital voice words. The voice or audio signals of the user ports 12 are sampled 8,000 times each second. Each user port is assigned a dedicated time slot, as is the bus controller 34 itself.

The setup of a two-way conversation is initiated when, for example, a telephone set 14 goes off-hook and dials a directory number, or extension number, of another telephone set connected to the system 10. The user port of the off-hook telephone set consults a table to determine the time slot of the port associated with the called telephone set. Assuming for purposes of example, telephone set 14a is attempting to communicate with telephone set 14b, and port 12a is assigned time slot 50 and port 12b is assigned time slot 90. Then, the microprocessor of port 12a would insert a "wake up" status word in its time slot 50 on the TDM bus 30. Port 12b continuously monitors all time slots of the TDM bus 30 for the presence of a "wake up" word that specifies time slot 90. User port 12b will sense a wake-up status word in time slot 50, and thus it is known that port 12a desires communications with port 12b. In response, the processor of port 12b will insert in its time slot 90 an acknowledgement status word, which, when sensed by port 12a, completes a "hand shake" between the ports 12a and 12b. Port 12a then sends a "call request" message that is received by port 12b. This message is several bytes long and takes several frames to transmit, after the attention of port 12b has been obtained. Identical techniques are used for port 12b to send an "accepted" message if telephone set 14b is idle.

According to conventional telephone signalling techniques, the circuits of port 12b will ring telephone set 14b, and when answered, communications are established therebetween. Analog conversion circuits in ports 12a and 12b are effective to provide unidirectional transmit audio signals and unidirectional receive audio signals by way of hybrid circuits, and otherwise, that can provide corresponding digital words for transmission on the TDM bus 30. As will also be described in more detail below, the analog-to-digital conversion of voice signals is typically compressed or companded according to A-law or $\mu$-law standards from a thirteen-bit linear digital words to eight-bit coded voice words.

In any event, the processor controlled circuits in port 12a transmit digitized voice signals received from the telephone set 14a onto time slot 50 of a TDM collection bus of the bus 30, and receive digitized voice words from time slot 90 on a TDM distribution bus of the bus 30. In like manner, the processor controlled circuits of port 12b transmit in time slot 90 digitized voice information received from telephone set 14b on the TDM collection bus, and receive digitized voice words from time slot 50 on the TDM distribution bus. With this arrangement, ports 12a and 12b can provide two-way voice communications between telephone set 14a and telephone set 14b, without the active intervention of the bus controller 34 or any other type of central controller. Of course, the bus controller 34 provides the timing signals, but otherwise does not intervene in the establishing or the carrying out of the two-way communications described above. As can be appreciated, and as will be discussed below, data communications can be carried out instead of, or in addition to, voice communications in a similar manner. The basic type of handshake can also be carried out between the other user ports 12 which are connected to the operator consoles 18, the trunks of central offices 20, the communication links of radio telephone equipment 22 and any other type of telecommunication carrier or equipment, as denoted by numeral 24. Further, communications between any one of the user ports 12 can be established with the bus controller 34, as the bus controller itself has a dedicated time slot for communicating digital messages.

TDM Bus Structure

FIG. 2 is a table which identifies the various conductors of either of the TDM collection bus or the TDM distribution bus, both such buses being duplicated for purposes of enhanced reliability. There are three other conductors which are routed with the fourteen conductors to carry clock signals, framing signals and frame index signals. The TDM collection and distribution buses each have 17-conductor buses routed between the various user ports in an equipment rack. Of course, the fourteen bus conductors can each carry logic signals in time slot intervals. In accordance with the preferred embodiment of the invention, each time slot interval comprises one hundred twenty-two nanoseconds to accommodate 1024 such intervals within a 125 microsecond framing interval. The digital signals are preferably of a 5-volt logic level, although other logic levels can be employed.

The signals on the various TDM bus conductors are utilized differently, depending upon the type of bus cycle being used by the port microprocessors. With reference to FIG. 2, there is shown a bus cycle utilized by the invention in the normal course of exchanging digital voice words between t he user ports 12. When the TDM bus 30 is utilized in a voice cycle, as noted in FIG. 2, bits 0-7, comprising eight bits, are used in the voice bus cycle for carrying the eight bits of digitized voice information. Bits 8, 9 and 11 are in the digital low state, while the state of bit 10 is irrelevant (shown as an x) in the voice cycle. Bits 12 and 13 carry respective status and parity bit information, irrespective of the type of bus cycle.

The data cycle is similar to the voice cycle, with the exception that bit 8 is a digital high state, and bits 0-7 carry interport data messages rather than digitized and compressed voice information. Circuits in each user port 12 are sensitive to the state of bits 8-11, in that when a voice cycle is indicated, the digital signals of bits 0-7 are considered as voice information and, if received, are thereby processed and converted into analog form for further transmission to the telephone set, or other similar audio equipment. On the other hand, when a data cycle is indicated, data bits 0-7 are considered as raw data, and are processed as such, such as for port 12a to send a "call request" message to port 12b as described above.

A wake-up bus cycle employs bits 0-10 of the TDM bus 30, such cycle being uniquely identified with bit 11 being a digital high level. Accordingly, circuits in each user port 12 are sensitive to the detection of a logic high level in the bit 11 position, and thereby process bits 0-10 as port address information. The port address information specifies the destination user port to be interrupted, while the time slot in which such address appears identifies the source user port which initiated the destination port interrupt.

An executive wake-up bus cycle is uniquely identified with bit 11 of the TDM bus 30 being a logic low and the bit 9 being a logic high. The logic state of bit 0-8 and 10 are irrelevant in the executive wake-up cycle. Essentially, the latter mentioned wake-up cycle is employed by the bus controller 34 to interrupt all user ports to, for example, download directory information.

A parity bit is carried in each time slot on conductor position 13 of the TDM bus 30. The parity bit provides a conventional error checking mechanism for parity circuits in each user port 12. Parity checking circuits of conventional design can be employed in each user port 12 to compute even or odd parity, and thus determine the operational integrity of the digital signals transmitted during each frame interval. The status bit carried in position 12 of all fourteen conductors of the TDM bus 30 is transmitted during each time slot, and thus there is a status bit associated with each user port 12. Actual status information is conveyed by the communication system 10 in terms of 8-bit words, and thus for each user port 12, eight frames are required to realize a complete 8-bit status word.

The status bits are caught and maintained in each port 12 of the system on a continuous basis by dedicated hardware circuits in each such port. Each port thus has readily available the status of all the other ports. The status word of one port indicates BUSY, CALL FORWARDED, DATA CALL IN PROGRESS, RINGING OUT, and other status conditions. This is used by ports 12 of the system to make many call processing decisions without the need to send a message and wait for a reply. This mechanism substantially decreases data traffic within the system, and provides substantially faster setup of large conferences than would otherwise be the case. The status table can be consulted by the processor in a user port when, for example, initiating a call to another port. A translation is carried out between the extension number input by the calling party and the time slot of the destination user port. The identification of the user port can be cross referenced in the status table to determine if the destination port is idle or busy. If busy, further call processing need not be attempted, but rather a busy tone can be returned to the calling port by its processor without ever interrogating the destination port.

FIG. 3 illustrates the general timing waveforms characteristic of the time division multiplex bus 30. It should be understood that the duplicated TDM bus of the invention includes as pairs; an A collection bus and a C distribution bus, and a B collection bus and a D distribution bus. Waveform 50 comprises a framing pulse for defining a group of 1024 time slots on the A collection bus 60. The time slots are noted by waveform 54. As noted, within the 125 microsecond framing interval, there are 1024 time slots associated with each of the conductors shown in FIG. 2 Importantly, the time slots 54 on the TDM collection bus 60 are delayed with respect to the frame pulse 50 by about one quarter of a frame interval. To be describe more thoroughly below, such delay allows each user port 12 to assemble data and ready the port circuits for transmission when the assigned time slots are present on the TDM collection bus 60. The delayed time slot clock signal 54 is generated by the bus controller 34 and is coupled to each of the user ports 12 for purposes to be described below. Also shown is an index signal 52 which comprises a pulse aligned with various frame interval pulses 50, but occurring only once in every eight frames. Essentially, the index signal 54 defines a group of eight framing intervals for completing the transmission of a single 8-bit status word on TDM bus conductor number twelve.

FIG. 3 also illustrates the basic framing and time slots for the C distribution bus 62. As can be seen, the frame pulse 56 and the index pulse 58 are coincident with the first time slot (TSO) of the collection bus 60. The time slots 60 of the distribution bus 62 are not delayed with respect to the distribution bus framing pulses 56, but rather occur in a conventional timed manner. It is to be understood that the timing relation between the B collection bus 64 and the D distribution bus are identical to the waveforms shown in FIG. 3.

FIG. 4 identifies the allocation of the various time slots according to the invention. While the time slots can be allocated as to function in an arbitrary manner, and can be varied to optimize the efficient communication function, the FIG. 4 allocation is believed to be well suited for providing full service telecommunication facilities as a PABX system. In the preferred form of the invention, the four time slots 0-3 are dedicated for use by the bus controller 34 to transfer data when downloading software programs to the various user ports 12. For example, when a user port 12 is initially installed in a card or module cage in the communication system 10, a software program is downloaded thereto by the bus controller 34. The software program will depend upon the type of user equipment connected to the port, as telephone set ports require different operating parameters than central office trunk ports. Nevertheless, user programs for each type of port in the system are maintained resident in the bus controller 34.

Time slot 4 is dedicated to a music-on-hold function which is available to each port 12 of the communication system 10. When, for example, a party has been placed on hold, the processor of the associated port can sense such condition, and retrieve the data in time slot 4 and couple the digitized music to a digital-to-analog converter for conversion into analog music signals. Such music signals can be transferred to the telephone set on hold in the usual manner.

Time slot 5 of the TDM bus 30 is dedicated to the processor of the bus controller 34. When the bus controller 34 is to communicate with other user ports 12 by way of the TDM bus 30, time slot 5 is employed to carry data messages. For example, when it is desired to establish a complicated conference with numerous ports, conference lists can be stored in the bus controller 34. Thus, when a user inputs information concerning such a conference call, and several digits identifying a particular conference list, such list can be requested and downloaded from the bus controller 34 to the appropriate user port 12.

Time slots 6-31 are each dedicated to a particular tone to thereby make available to every user port 12 in the communication system 10 all the typical telecommunication tones. The tones are continuously available in repetitive cycles in the respective tone time slots. In various time slots call progress tones can be transmitted to the user ports 12. Such call progress tones can comprise dial tones, busy tones, ring back tones, trunk busy tones, etc. The 16 DTMF tones are also available in respective tone time slots. Further, test tones such as warbles, 1 khz, 2.6 khz, and quiet tones are also available in respective tone time slots.

Disclosed in U.S. Pat. No. 4,205,203 is a tone generator for producing numerous telecommunication tones, and particularly adapted for operating in a TDM type of system. The disclosure of such patent is incorporated herein in its entirety by reference thereto.

Time slots 32-1023 are dedicated to respective user ports 12 of the communication system 10. While not all user ports 12 may be needed or required by a particular configuration of the communication system 10, up to 992 such time slots are available in this embodiment for servicing a corresponding number of user ports 12. By uniquely dedicating each one of the time slots 32-1023 to respective user ports 12, appropriate tables can be maintained resident With each user port 12 to determine which time slot to utilize for communicating with any other user port. As is well known in other communication systems employing TDM buses, the time slot assignments are transient in nature, and are maintained only for the duration of the particular telephone call. In such a situation, a central controller maintains the status of the time slot assignment for the duration of each call, which can present obvious hardware and software burdens, like continuous management of the time slots with respect to all the telephone calls.

Figure 5:
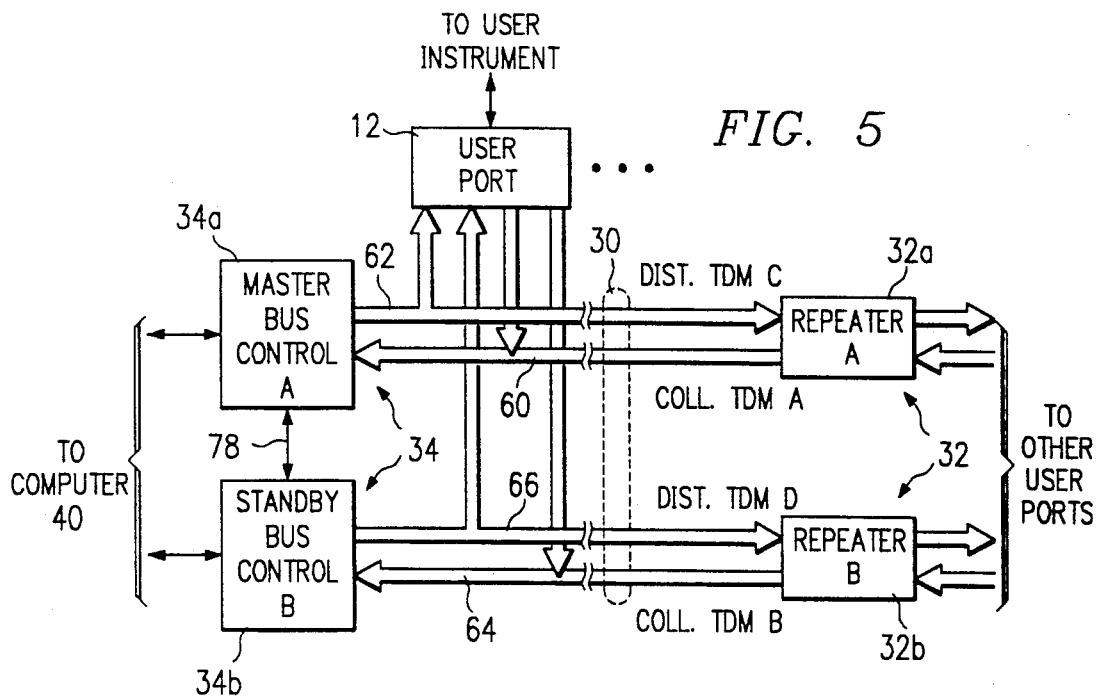
FIG. 5 is a diagram of the duplicated TDM bus system to which the user ports are connected.

With the foregoing in mind, reference is made to FIG. 5 where there is illustrated the TDM bus structure according to the preferred form of the invention. Such figure illustrates a single user port 12 connected to the TDM bus 30, it being understood that many more user ports would typically be connected to the bus in a similar manner. The TDM bus 30 of the invention includes a 17-conductor TDM A collection bus 60 (with timing signal conductors) and a similar 17-conductor TDM C distribution bus 62. For purposes of reliability, such buses are duplicated as respective B collection bus 64 and D distribution bus 66. Associated with the A collection and C distribution buses 60 and 62 is a master bus controller 34a. In like manner, a standby bus controller 34b is associated with the B collection and D distribution buses 64 and 66. Each user port 12 includes an inbound interface for connection to each TDM collection bus 60 and 64, as well as an outbound interface associated with each TDM distribution bus 62 and 66.

In practice, each user port module has fixed on its back connectors pluggable into other connectors of a backplane of a module cage. The backplane is a multilayer printed circuit board with printed wire paths defining the four 17-bit TDM buses. With this arrangement, if the master controller 34a and collection/distribution bus pair 60 and 62 become defective, the other duplicated bus equipment can be automatically employed to continue communication services.

Because high speed digital signals are carried on the TDM bus 30, the driving capabilities thereof are limited to a prescribed distance. Hence, a pair of repeaters 32a and 32b can be provided for reshaping and resynchronizing the signals for transmission additional distances. According to the invention, a single pair of bus controllers 34a and 34b are provided in one of many equipment shelves housing the user ports 12. Each shelf of the bay has a repeater 32 for driving the user ports connected within such shelves. In this manner, numerous different equipment shelves of user ports can be simultaneously driven so that all such ports maintain synchronized communications within the various time slots. Repeater circuits for carrying out such functions on digital signals are well known to those skilled in the art.

As can be appreciated from FIG. 5, voice or data words transmitted from each user port 12 is by way of backplane connectors to the respective TDM collection buses 60 and 64. Digital information received by each user port 12 is by way of connectors from the respective TDM distribution buses 62 and 66. Therefore, in order to provide a bi-directional communication link between two or more ports, a unidirectional TDM collection bus and associated unidirectional distribution bus are employed. Each bus control circuit 34a and 34b includes a "U-turn" circuit for receiving data samples on the collection TDM bus, resynchronizing such data samples, and driving them back to all of the user ports 12 on the distribution TDM bus 62. This technique allows each user port 12 of the communication system 10 to make available at all times voice and control data signals originating from any of the other user ports.

It is to be noted that only one bus controller 34a or 34b is online at any one time, one being a master and one being a standby, as identified in FIG. 5, or vice versa. The master or standby status of the bus controllers 34a and 34b can be changed manually by front panel buttons, or automatically on the detection of a system fault. In addition, each bus controller 34a and 34b maintains updated operating software, call processing tables, etc. so that if placed online, normal communications can continue without intervention. To that end, a data link 78 is interconnected between the bus controllers 34a and 34b to provide serial data communications therebetween for updating purposes. For example, if bus controller 34a is presently online as a master, and if a table or program software therein is updated via the computer 40, such update is subsequently transferred by the master bus controller 34a to the standby bus controller 34b, via the data link 78. The reverse operations will occur should bus controller 34b be the online bus controller, and 34a remain in a standby status.

Bus Controller

Figure 6:
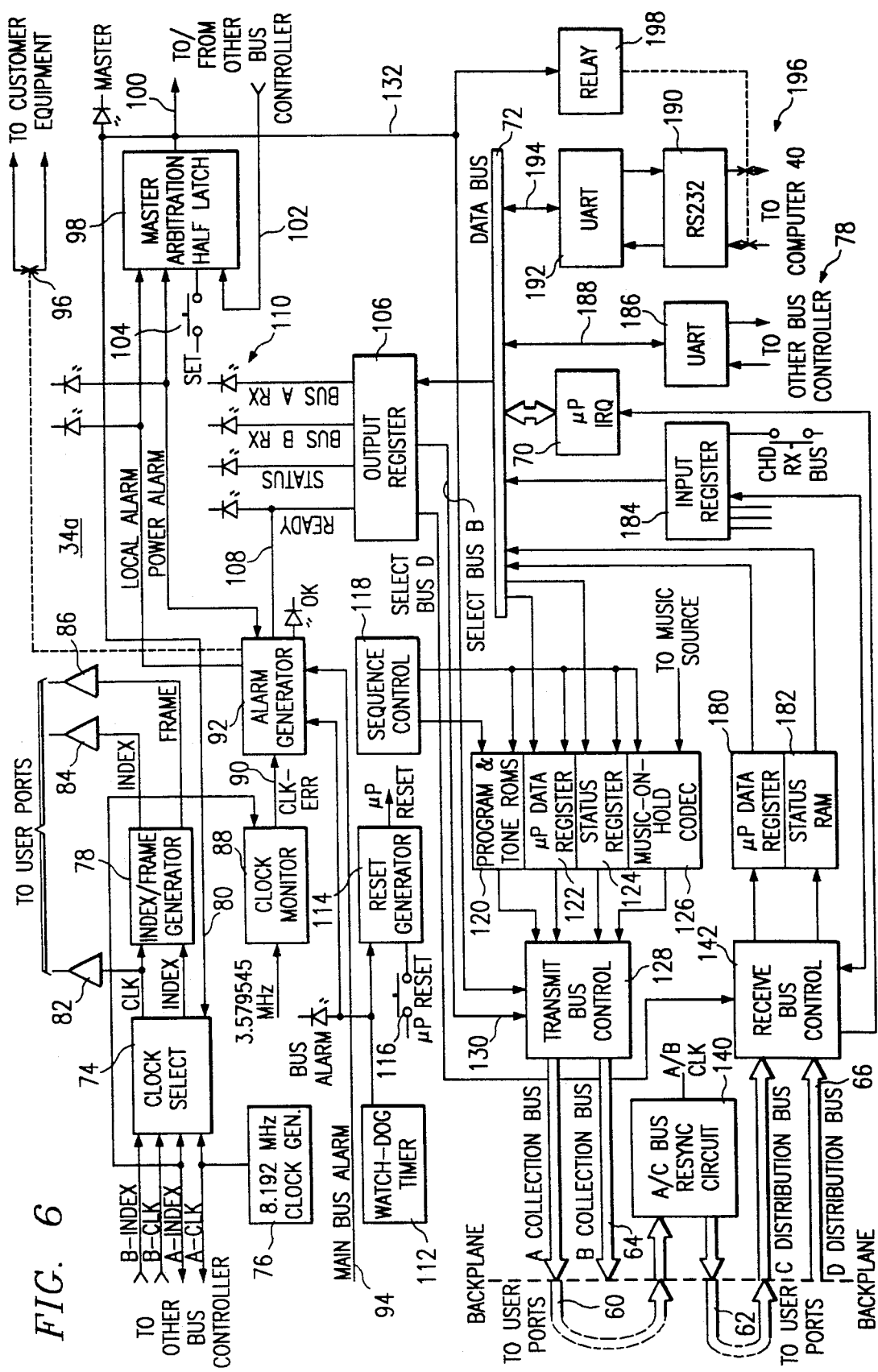
FIG. 6 is a detailed block diagram of a bus controller of the invention.

With regard to FIG. 6, one bus controller, controller 34a, is illustrated in detailed block diagram form.

According to the preferred embodiment of the invention. It is to be understood that the other bus controller 34b is constructed in an identical manner so as to be functionally interchangeable and pluggable into one or the other of the card shelve slots allocated for the bus controllers. While not shown, and as noted above, right and left printed circuit board connectors are soldered in a backplane so that the bus controller is interconnected to the duplicated TDM buses 60-66, as well as connected to each other and the computer 40. Also as noted above, the bus controller 34 generates timing signals which are carried with the TDM bus wires to each user port 12 of the communication system 10.

With specific reference to the various circuits of the bus controller 34a, there is shown a microprocessor 70 which services a bi-directional data bus 72 for communicating data information to and from the various circuits of the bus controller 34a. The microprocessor 70 can be of a conventional type, such as an 8-bit microprocessor having sufficient on-board random access memory to carry out the functions described below. The bus controller 34a further includes a clock select circuit 74 which selects whether the bus controller 34a will output clock signals generated therein, if it is master bus controller, or synchronize with the clock signals of the other bus controller 34b if such other bus controller 346 is the master. A 8.192 Mhz clock generator 76 generates clock signals which are input to the clock select circuit 74 of the bus controller 34a, as well as coupled to the other bus controller 34b. In like manner, an index/frame generator circuit 78 generates index signals which are coupled back to the clock select circuit 74, as well as to the other clock select circuit in the other bus controller 34b. Index and clock signals from the other bus controller 34b are coupled to the clock select circuit 74. The selection of the clock and index signals by the clock select circuit 74 is governed by the logic state on conductor 80, which function will be described below. The clock select circuit 74 provides an output clock signal which is buffered by a driver 82 and distributed to each of the user ports 12 with the TDM bus 30. The clock signal is substantially the same as that shown as reference character 54 in FIG. 3. The index-/frame generator 78 receives clock signals as well as index signals, and produces corresponding index and frame output signals. The index/frame generator 78 includes counters and associated circuits for generating the index and frame pulses from the clock pulse signal. As with the output clock signal, the index and frame signals are buffered by corresponding drivers 84 and 86. It should be noted that the first bus controller 34a drives the TDM A collection and C distribution buses associated therewith with the locally derived clock signals. On the other hand, the second bus controller 34b, when functioning as standby, maintains synchronization with the master bus controller 34a, and drives its associated TDM B collection and distribution buses in a synchronous manner. The master and standby buses thereby operate synchronously with respect to the time slots so that switchover can be accomplished without loss of coordination or timing of the various time slots. Basic synchronization between the master and standby bus controllers is afforded by the index clock pulse output by the generator 78. Also, the backplane connectors of the bus controllers 34a and 34b are interconnected so that if either bus controller module is inserted into the left connector, such module will drive the TDM A collection bus, but if plugged into the right-hand connector, such module will drive the TDM B collection bus. The clock signal driven by the buffer 82 is coupled to each user port to synchronize such ports with the time slots of the collection TDM bus.

A clock monitor 88 receives a 3.579545 Mhz clock signal as one input, and the A-index signal as another input. This input of the clock monitor 88 comprises a standard color burst frequency conventionally utilized in the color televisions. The clock monitor 88 essentially counts the number of 3.579545 MHz pulses occurring within a one millisecond period between two index pulses. If the correct number occurs, then the bus controller 34a is allowed to continue operation. On the other hand, if this criterion is not met, a clock error signal is generated on clock monitor output 90 for triggering an alarm generator 92. The alarm generator 92 generates various visual and electrical alarms utilized by other circuits of the bus controller 34a. In addition, the alarm generator 92 monitors power supply circuits as well as other circuits of the bus controller 34a for generating the appropriate alarms and providing a controlled shutdown of the controller 34a, should circuit malfunctions be detected. The alarm generator 92 can receive a main bus alarm input 94, and provide closure of a set of relay contacts 96 for alerting customer or other equipment of the alarmed condition.

In order to also coordinate the on-line operation of one or the other of the bus controllers 34, a master arbitration half latch 98 is provided. Essentially, the circuit 98 comprises one half of a set-reset flip-flop, the other half being in the other bus controller 34, and connected by conductors 100 and 102 thereto. When both bus controllers 34a and 34b are plugged into the appropriate backplane connectors of the communication system 10, both half latches operate as a single cross-coupled flip-flop, thereby providing opposite digital states to each bus controller. In this manner, one digital state determines the master status of one bus controller, and the other digital state controls the standby status of the other master controller. However, and in accordance with an important feature of the invention, should one bus controller be removed from the backplane connector, the half latch 98 in the remaining bus controller assumes the appropriate digital state to force the remaining controller to assume a master bus controller status, if it does not have any alarm conditions. Therefore, the half latch circuit configuration allows the operation of only a single master bus controller when both such modules are active within the backplane connectors, and in addition, a master status is assumed by the bus controller remaining in the backplane should the other be removed. A front panel switch 104 is provided with each bus controller module so that when manually operated, absent alarms, master status can be achieved. Various conductors from the alarm generator 92 are also connected to the half latch circuit 98 so that the master-standby status of a bus controller can be automatically changed, should an alarm condition occur. Also as noted in FIG. 6, the microprocessor 70 is connected by way of an output register 106, and therethrough by conductor 108 to the alarm generator 92. Hence, the microprocessor 70 can be programmed with various diagnostic routines and other circuit sensors to sense malfunction of the circuits and thereby control the master-standby status of the bus controller 34a. A number of visual indicators 10 are connected to the output register 106 to yield a visual indication of the operational status of each bus controller 34a and 34b.

As noted above, the master arbitration half latch circuit 98 is connected by conductor 80 to the clock select circuit 74 to allow selection between the various signal inputs to such circuit 74. In other words, should bus controller 34a be presently designated as a master, as determined by the state of the half latch 98, then the clock select circuit 74 will be controlled to select clock signals, frame and index pulses, generated locally by the generator 76. On the other hand, if bus controller 34a is presently a standby bus controller, then the clock select circuit 74 will be controlled, via input 80, so that its timing signals are synchronized by the B-clock signal and the B-index signal generated by the other bus controller 34b, in connection with its master status.

A watch dog timer 112 provides an input to the alarm generator 92, as well as an input to a reset generator 114. The reset generator 114 is responsive to either input from the watch dog timer 112, or a panel-mounted reset switch 116, for generating a microprocessor reset signal.

A sequence control circuit 118 is connected to a number of other circuits for inserting associated bits into various time slots of the TDM collection bus. To that end, the sequence control circuit 118 is connected to program and tone ROM 120, a microprocessor data register 122, a status register 124, and a music-on-hold codec 126. The respective outputs of such circuits are connected to a transmit bus control 128 which can transmit on the A collection bus 60 or the B collection bus 64. The transmit bus control 128 is connected to the output register 106 by a control conductor 130. The microprocessor 70 can output data to the output register 106 so as to control whether the transmit bus control circuit 128 derives timing from the A collection bus, or from the B collection bus, for the purpose of transmitting data on both such buses. The transmit bus control 128 is also connected to the master arbitration half latch 98 by a conductor 132 for providing appropriate control.

The program and tone ROMs 120 include adequate storage space for storing the operating program for each of the user modules 12. In addition, memories are providing for storing digitized samples of various call progress tones, DTMF tones, test tones, etc. utilized by the communication system 10. While not shown, the sequence controller 118 is synchronized with the A-clk signal so that program data and digitized tone samples can be inserted into the appropriate time slots and transmitted by the transmit bus control circuit 128 onto both collection buses. As noted above, time slots 0-3 are dedicated to the downloading of data from the program ROMs 120 and transmittal to the user ports 12. In addition, time slots 6-31 are dedicated to the transmission of various tones, as read from the tone ROMs 120. The sequence control circuit 118 is configured to continuously transmit the operating program data and the various tones in their respective time slots.

As noted above, the microprocessor of the master bus controller 34 can communicate with the user ports 12 by way of a dedicated time slot, namely time slot number 5. The microprocessor data register 122 is adapted for coupling data from the microprocessor 70 to the transmit bus control 128 to accomplish such communication. In order to transmit data, such as conference lists, and the like, the microprocessor 70 loads such information into the data register 122, and the sequence control 118 then downloads such data sequentially into time slot number 5 for transmission on the collection bus by the transmit bus control 128. The data register 122 can comprise a parallel-in, parallel-out type of shift register, or other arrangement of storage circuits.

The contents of the status register 124 are transmitted on TDM conductor twelve in time slot number five, as noted in FIG. 2. Like the data register 122, the microprocessor 70 can load the status register 124 with status information for transmission by the transmit bus control 128 on the collection bus. As noted in FIG. 6, the microprocessor data register 122 and status register 124 are connected to the microprocessor data bus 72.

The music-on-hold circuit 126 receives analog music signals as an input, and converts the same by conventional codec circuits into compressed digital words for transmission in time slot 4. Time slot 4 is dedicated to the continuous transmission of the digitized music. As with the other circuits, the circuit 126 is controlled by the sequence controller 118 for supplying the digitized music information in time slot 4.

The transmit bus control 128 has a pair of 14-bit output buses, namely the A collection bus 60 and the B collection bus 64. When the bus controller 34a is master, its transmit bus control 128 causes transmission of all the above mentioned information onto both the A collection bus 60 and the B collection bus 64. Should bus controller 34a not be currently designated as master, then its transmit control 128 inhibits it from transmitting anything onto either of the two collection buses.

Each user port 12 is connected to both the A collection bus 60 and the B collection bus 64 for transmitting data thereon, voice words, etc. in their respective time slots. The A-collection bus 60 terminates with an A/C bus resynchronization circuit 140 in bus controller 34a. The B collection bus 64 transmits with a B/D bus resynchronization circuit 140 in bus controller 34b. The resynchronization circuit 140 resynchronizes the data in each time slot of its respective collection bus and retransmits the same on its respective distribution bus. The configuration shown in FIG. 6 is depicted as plugged into a left-hand backplane slot, and thus the bus resynchronization circuit 140 transmits on the C distribution bus 62, and the TDM signals are received thereon by a receive bus control circuit 142. When plugged into a right-hand backplane slot, the bus resynchronization circuit 140 would transmit TDM signals which would be received by the bus controller 34b on the D distribution bus 66. Again, all user ports 12 receive data, voice words, etc. transmitted from the other ports, or from the bus controller 34 itself, on both the C or D distribution buses 62 or 66.

Figure 7:
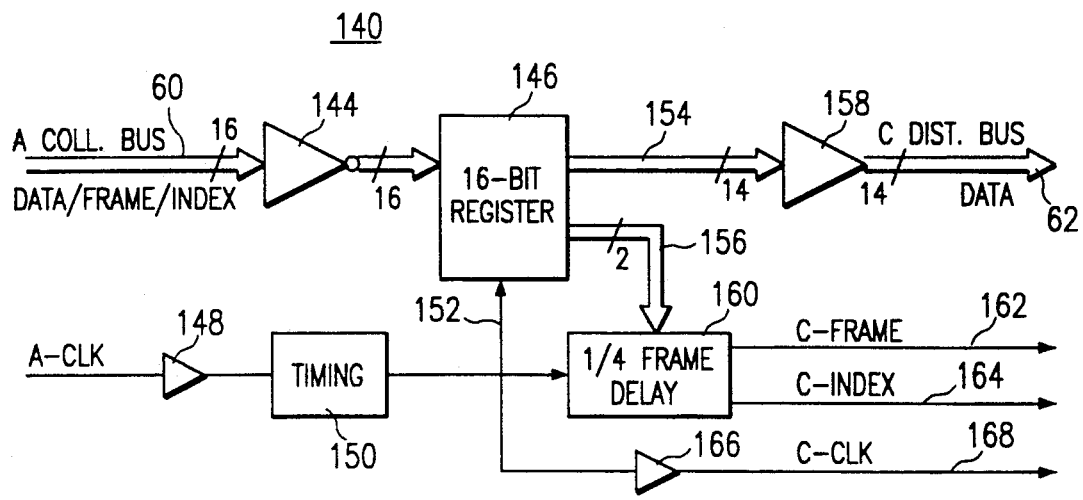
FIG. 7 is a schematic circuit diagram of a bus resynchronizing circuit which connects to a TDM collection bus to a TDM distribution bus.

With reference to FIG. 7, there is shown the bus resynchronization circuit 140 in more detail. The bus resynchronization circuit 140 includes a number of logic Schmitt inverters 144 for inverting the signals carried by each of the fourteen time slot conductors of the TDM bus (FIG. 2), as well as the frame and index pulses. All sixteen parallel bits are temporarily stored in a 16-bit register 146. The A-clk signal is buffered by a buffer 148 and is delayed appropriately by a timing circuit 150, the output of which is coupled to the register 146 for latching the 16-bits. The extent of the delay is generally that which occurs as a result of the distributed capacitance of the collection bus. The timing circuit 150 essentially comprises one or more gate delays so that the latch input signal 152 of the register 146 has a rising edge occurring about the midpoint with the sixteen bits of input. While various of the sixteen bits may be misaligned due to jitter, non-uniform delay, and otherwise, such bits are latched into the register 146 and again outputted simultaneously, thereby removing any instability, jitter or differences due to non-uniform delay. The output of the register 146 includes fourteen data bits, as well as two signaling bits, defining the frame bit and the index bit. The fourteen data bits on bus 154 are buffered with a corresponding number of buffer-drivers 158 and retransmitted on the C distribution bus 62.

In accordance with another feature of the invention, the frame and index signals output by the register 146 on the bus 156 undergo a delay contributed by the delay circuit 160. The delay circuit 160 is essentially a counter which counts at the A-clk clock rate and repeats input pulses about 256 counts later. Since the number 256 is one-fourth of the number of times slots in a frame, the frame and index pulses undergo a quarter frame delay. The quarter frame delay circuit 160 provides a C-frame and a C-index signal on respective conductors 162 and 164, which conductors are routed along with the C distribution bus 62 to each of the user ports 12. The slightly delayed A-clk signal is buffered with a driver 166 and reproduced as a C-clk signal on conductor 168, also routed along with the other TDM data signals and framing signals. It should be understood that the other bus controller 34b plugged into the other shelf slot includes a similar circuit for receiving B collection bus 64 data and timing signals, and for producing corresponding D distribution bus and timing signals.

Reference is made back to FIG. 3 where there is illustrated the collection bus timing signals and the delayed distribution bus signals resulting from the bus resynchronization circuit 140.

The quarter frame delay noted in FIG. 3 is related to the time required for each user port 12 to carry out an internal coordination to gather appropriate data and present the same for transmission in its assigned time slot of the collection bus 60 or 64. Once each user port 12 receives a framing pulse 50, data information is required about 31 microseconds ($\frac{1}{4}$ frame) after the passage of a number of clock pulses equal to the physical port number of respective user port 12. This ensures that each user port 12 transmits its data or voice, etc., in that the slot having the same number as the physical position of that particular port 12 in the system 10.

The timing concern between the framing pulse and the time slots is not a concern with respect to the distribution bus, as also shown in FIG. 3. Here, the framing pulse 56 is coincident with the initial time slots, thus eliminating any requirement for a delay. This can be appreciated as each user port 12 can quickly retrieve data from the various time slots of the TDM distribution bus by hardware circuits, without advance preparation. Accordingly, the timing of the distribution bus with respect to frame timing and the time slots is generated in a traditional manner.

With reference again to FIG. 6, the receive bus controller 142 has a pair of outputs, one coupled to a microprocessor data register 180 and the other coupled to a status memory 182. The output of the data register 180 and the status RAM 182 are connected to the microprocessor data bus 72. The receive bus control 142 has a control input from the output register 106 for selecting whether to receive data from the C distribution bus 62 or the D distribution bus 66. Further, the receive bus control circuit 142 has an output connected to the microprocessor 70 for interrupt purposes. When data is to be received from one of the user ports 12, such data is received by the bus control circuit 142 and stored in the data register 180, whereupon the microprocessor 70 is interrupted. After the receive bus control circuit 142 has transferred the data to either the data register 180 or the status RAM 182, the microprocessor 70 can retrieve such information via the data bus 72. The receive bus control circuit 142 continuously monitors the status bits carried by the TDM distribution bus conductor number twelve, and stores such information in the status RAM 182. The microprocessor 70 can thus receive both data information as well as status information of the current status of each of the user ports 12 of the communication system 10.

Parity information is also retrieved from the parity conductor (number thirteen) of the TDM bus 30 and transferred from the receive bus control circuit 142 to an input register 184. The input register 184 is connected to the data bus 72 for coupling data information to the microprocessor 70. The input register 184 also has one or more input switches, one of which may be a panel-mounted switch for changing the active receive bus to the bus controller. The input register 184 can also have a number of switch inputs to determine the baud rate of transmission of asynchronous transmitting and receiving circuits described below. Further, the input register may have an input from the other bus controller so that the microprocessors can intercommunicate by way of the respective input registers 184.

A first universal asynchronous receive transmit (UART) circuit 186 has a bi-directional bus 188 connected to the microprocessor data bus 72. The unidirectional serial receive and transmit output buses 78 are connected to the other bus controller. The bus controllers 34a and 34b can thus communicate with each other via the serial asynchronous link 78 to, for example, download directory table updating and tabular information from one bus controller to the other.

A second UART 192 is connected by unidirectional, serial receive and transmit conductors to an RS232 port 190. The second UART port 192 is connected by a bidirectional bus 194 to the microprocessor data bus 72. The serial outputs of the RS232 port 190 are connected through relay contacts 196 to the computer 40. With this arrangement, the computer 40 can download operating program software and other data to the master bus controller 34a. The operation of contacts 196 are controlled by a relay 198 which is, in turn, controlled by the master arbitration half latch 98. In other words, the relay 198 can only be operated by the bus controller which is presently a master, and therefore the computer can only communicate with a master bus controller. Information and data transferred from the computer 40 to the standby bus controller can only be accomplished through the intermediate transfer occasioned by the microprocessor 70 of the master bus controller. Of course, the master bus controller can transmit data to the computer 40 by way of the serial transmit bus output by the UART 192.

User Port

FIG. 8 illustrates in block diagram form a user port 12 according to the invention. The particular type of user port illustrated is employed in connection with a telephone subscriber set 14. The user port 12 includes an outbound port interface 210 connected to the duplicated TDM distribution buses 62 and 66. In like manner, an inbound port interface 212 is connected to both of the TDM collection buses 60 and 64. A subscriber instrument interface 214 includes conventional telephone circuits for communicating voice and telephone signaling information to a subscriber set 14. The subscriber instrument interface can include subscriber line power and ringing circuits, off-hook detectors, hybrid circuits and other conventional circuits enabling the user port 12 to communicate with the telephone subscriber set 14. When user ports 12 are used in conjunction with other subscriber instruments, such as mobile radios, operator consoles and other switching apparatus such as central office trunks, different subscriber instrument interfaces may be required, or tailored to interface with the particular external communication equipment.

A microprocessor and associated circuits 216 is utilized in each user port 12 to control the operations of all the circuits thereof to carry out overall telecommunication functions. Digital control logic 218 is included in each user port 12 for receiving various control and address bits from the distribution bus, and transmitting other control bits to the collection buses, as well as control a conference circuit 220. The digital control logic 218 also communicates with the microprocessor circuits 216. The microprocessor in the circuit 216 can thus maintain status of the user port 12, as well as the other user ports to facilitate the coordination of communications therewith. Importantly, the microprocessor circuits are active in initially setting up a telephone call, but thereafter the high speed logic circuits process and direct the time slot information to and from the user port 12.

The flow of digital voice words from the port interface circuits 210 and 212 is carried out as follows. In providing standard two-way telephone conversations, the outbound port interface 210 selects 8-bit voice words from the time slot a selected of one of the distribution buses 62 or 66. The selected voice words are transmitted via an internal 8-bit bus 222 to the conference circuit 220. For two-way telephone conversations, the voice words proceed unchanged through the conference circuit 220 and are carried by the 8-bit internal bus 224 to the subscriber instrument interface 214. In the subscriber interface 214, the digital voice words are converted to analog samples and are applied through a filter network with other serial samples to form a representative analog waveform. The analog signal is transferred through other circuits of the subscriber instrument interface 214 to the earpiece of the telephone set 14. Of course, the digital control logic 218 maintains the user port 12 timed with respect to the time slots on the TDM buses so that voice words can be retrieved from and transmitted on the various TDM buses 30. The microprocessor circuits 216 are programmed to initially control the setup of the telephone call or conference and to maintain overview of the status of both the destination telephone set, as well as the telephone set 14 connected to the port 12, or home port. The microprocessor circuits 216 can also control the subscriber instrument interface 214 to establish audio transmission or to cause ringing to, or to detect off-hook conditions of the telephone set 14.

Audio information input into the mouthpiece of the telephone set 14 is converted by analog-to-digital converters in the subscriber instrument interface 214 with codecs which are similar to circuit 126 of FIG. 6. For telecommunication purposes, the analog voice signals from the telephone set 14 are generally digitized according to μ-law or A-law nonlinear formats. In any event, the nonlinear 8-bit voice words are output by the subscriber instrument interface 214 on bus 226 to the inbound port interface 212. Parity is computed over the bits by circuits in the inbound port interface 212, and status bits are also added to the bitstream and driven onto the A and B TDM collection buses 60 and 64.

In synchronizing the user port 12 with respect to the TDM bus 30, clock and frame signals are coupled by bus 228 from the outbound interface 210 to the high speed digital control logic 218. As noted above, the digital control logic communicates with the microprocessor circuits 216 by way of the bi-directional bus 232 which carries parallel control bits. Parallel control bits are also transmitted from the digital control logic 218 on bus 234 to each port interface 210 and 212. Parallel port status and port address bits are transmitted from the microprocessor circuits 216 to the inbound port interface 212 on bus 236.

It should be noted that the microprocessor circuits 216 include a sequence control circuit 118 and associated microprocessor data registers 122, status registers 124 and transmit bus controllers 128, similar to that shown in the bus controller in FIG. 6. In addition, the microprocessor control circuits 216 also include a receive bus controller 142 and data register 180 and status RAM 182, also similar to that shown in FIG. 6.

With respect to FIG. 9, there is shown a more detailed illustration of the outbound port interface 210 of the user port 12. Such interface includes a number of Schmitt-type buffers 240 for buffering the C distribution bus 62 before input to a 2:1 multiplexer 242. The D distribution bus 66 also has Schmitt-type buffers 244 before being input to the other input of the multiplexer 242. The buffered interface prevents logic circuit malfunctions in the interface from affecting the bus and thus preventing the other user ports form using the bus. The selected output of the multiplexer 242, comprising a 16-bit signal, is latched into a register 246. The output of the register 246 comprises internal bus 222 for carrying the voice data bits and the frame synchronizing signals. The C-clk and D-clk signals are buffered by respective buffers 248 and 250 before being input to a 2:1 multiplexer 252. The output of the multiplexer 252 comprises a clock signal for the user port 12. The clock signal is also effective to provide the latching signal for the 16-bit register 246. The selection of one or the other of the inputs of the multiplexers 242 and 252 is controlled by the digital control logic 218.

FIG. 10 illustrates in block form the functional circuits of the inbound port interface 212. Voice words output from the subscriber instrument interface 214 are carried by the bus 226 to a pair of parity generators 260 and 262, the output of which is a parity bit for transmission with the voice words over the TDM collection buses 60 and 64. Parallel control bits carried on bus 234 are processed similarly. More specifically, the voice words are coupled on the internal bus 226 to one register/driver 264, and therefrom to the A collection bus 60. Voice words are also coupled by internal bus 226 to a second register/driver circuit 266 which drives the B collection bus 64. Status bits are coupled from the microprocessor circuits 216 to both parity generators 260 and 262, and to both register/drivers 264 and 266 on the bus 236.

Conference Circuit

Figure 11:
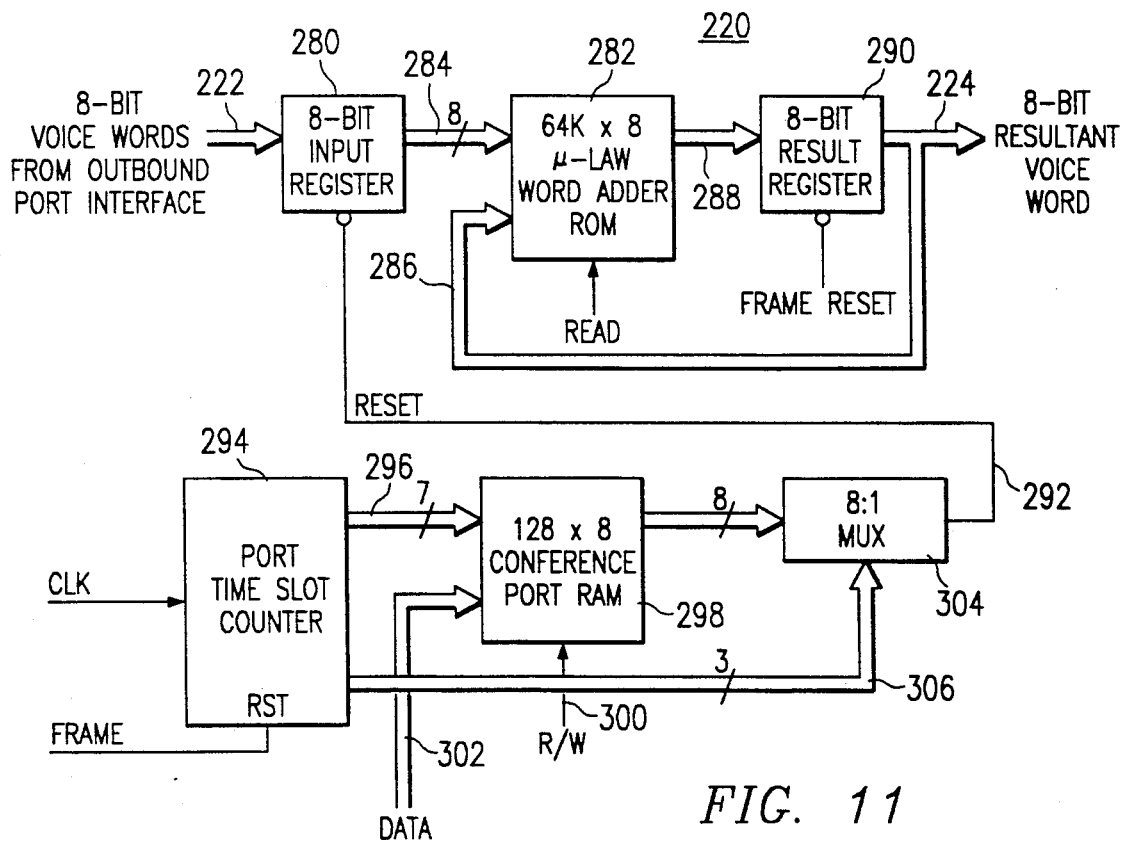
FIG. 11 is a schematic circuit diagram of a memory circuit for summing a number of compressed audio words.

In FIG. 11 there is shown a detailed block diagram of the conference circuit 220 as utilized in each user port 12. Although the conferencing technique of the invention can be embodied in a number of different types of circuits, the preferred form includes an 8-bit register 280 for receiving 8-bit voice words from the outbound port interface 210. The eight bits of each word are temporarily latched in the register 280 and then presented to a read only memory 282. The read only memory is programmed to store the sum of any two 8-bit voice word addends presented to its two 8-bit inputs. A first 8-bit input is presented to the memory 282 on bus 284, while a second 8-bit input is presented on bus 286. The two 8-bit words presented to the memory 282 comprise a 16-bit address which defines a unique location having stored therein the sum of the two address words to be added.

Importantly, the read only memory 282 is programmed to store the summed results of two μ-law voice words so that the memory output also complies with the μ-law compression format. Since the voice words carried by the communication system 10 are eight bits in length, the addition of any two 8-bit words yields a total combination of words equal to 64K. Those skilled in the art can readily derive programming techniques for generating the summed results of any two 8-bit μ-law compressed words, for programming the read only memory 282. The summed results of A-law compressed voice words can also be derived and stored in the read only memory 282, should A-law compression techniques be utilized in the communication system 10.

The memory 282 provides an 8-bit output on bus 288 to an 8-bit result register 290. The result register 290 temporarily stores the memory readout and presents such readout as an 8-bit resultant voice word on bus 224, as well as an 8-bit word coupled back to one address input of the memory 282 on bus 286.

The 8-bit input register 280 is reset by a signal on line 292 at the TDM bus time slot rate. The result register 290 is reset at the beginning of each frame to a predefined state which represents a zero voice level according to the μ-law format. To that end, the input register reset signal circuits include a port time slot counter 294. The counter 294 provides a unique 10-bit output for each time slot, seven bits of which are carried by bus 296 to a conference port RAM 298. Prior to the initiation of each conference telephone call, the conference port RAM 298 is written with data by the port microprocessor 216. The data written constitutes a single bit for each port to identify which time slots are involved in a conference, and which time slots are not. Preferably, memory locations in the conference port RAM 298 are written with a logic one bit in those locations with associated time slots to signify the participation in a conference. A logic zero will be written into the memory locations associated with time slots which will not be involved in the conference. The read/write input 300 of the memory 298 can be controlled by the microprocessor circuits 216 to write data therein by way of the 8-input data bus 302.

During the actual conferencing, the high speed logic circuit 218 causes the conference port RAM 298 to be read during each time slot to provide an indication of whether or not such time slot is to participate in the conference. The 8-bit output of the conference port RAM 298 is connected to an 8:1 multiplexer 304. The one-of-eight selection is carried out by the three least significant bits output by the port time slot counter 294. The three least significant counter bits are connected to the multiplexer 304 by bus 306. The conference port RAM 298 is read once prior to eight consecutive bus time slot periods, the address input on bus 296 comprises the most significant seven bits, and thus remains the same for eight time slots. With this circuit structure, a high speed conference memory 298 is not required, and thus conferencing is more effective. High speed multiplexers 304 are readily available and relatively inexpensive. Alternatively, a high speed, single output memory could be used without the multiplexer 304. During such eight time slots, the multiplexer is controlled by the three least significant bits on bus 306, thereby sequentially providing a single output, one bit at a time. The multiplexer 304 thereby provides a logic high signal on reset line 292 for each time slot participating in the conference. The logic high signal on the line 292 does not reset the 8-bit input register 280 and thus such register maintains the 8-bit signals on its output. On the other hand, when the multiplexer 304 outputs a logic low level on reset line 292, the 8-bit input register 280 is reset and thereby presents all logic zeros on its output. With this arrangement, the conference port RAM 298 can be written with data information such that for each time slot which is a participant in the conference, the associated 8-bit voice word from the outbound port interface is passed through the register 280 to the memory 282. For those time slots which are not to be participants in the conference, the conference port RAM 298 can be programmed to cause the input register 280 to be reset so that any voice words of the associated time slots are not entered into the conference circuit 220.

For communication systems having more than 1024 time slots, the size of the memory 298, buses and registers can be altered accordingly. The memory 282 can also store data to carry out logical or mathematical operations on data words input to the user port on the TDM bus 30. As an alternative to the foregoing, the signal on reset line 292 may be utilized in controlling the read operation of the address memory 282, rather than controlling the input register 280. In other words, the input register would always latch the voice words in each time slot, but the memory 282 would only be read when the digital word was in a time slot participating in the conference. The signal on line 292 can be employed in many other ways to accomplish the selective reading of the address memory 282.

It should be noted from the foregoing that each user port 12 includes a conference circuit 220, and that only the other conferees voice words are processed by the home conference circuit 220. The voice word generated by the home port does not become conferenced in the home port but are conferenced in the conference circuits of all other port conference circuits that are conferenced with the home port. In this manner, each port creates its own unique conference audio output, which is different than that created at the other ports in the conference. There are thus as many distinct simultaneous summed audio signals as there are participants in the conference. The conference circuit 220 only processes the voice words of all the other conferees without having to be concerned with also integrating the voice words of the person associated with the home user port. The conference circuit of the invention allows one user port to talk on some conferences and listen on some conferences, all simultaneously, and without degradation. No matter how complex the conferencing, each user port 12 puts only its own voice words on the collection bus. Each port takes voice words from all other conferenced user ports that it wants to listen to sequentially from the distribution bus and combines them into a composite voice word for listening by the user of the home port. As used herein, the term "home" port indicates the particular port of interest used by a subscriber. The foregoing technique alleviates the problems heretofore associated with the instant speaker algorithm. As will be described in the more detail below, the conference circuit 220 is also utilized for simple two-way conversations and the transmission of time slot tones to the port instrument interface 214.

In operation of the conference circuit, assume for purposes of example that time slots 100, 200 and 300 are associated with the user ports desired to be involved in a conference telephone call. Further assume that a particular conference circuit is associated with a home user port and time slot 100. Prior to the actual conferencing of the parties, the microprocessor 216 programs the home conference port RAM 298 to program all locations with zeros, except for those locations associated with time slot 200 and time slot 300 of the other ports, which will be programmed to store logic high levels. Since the home port user associated with time slot 100 does not need to hear his or her own voice words, such voice words will not be processed through the home conferencing circuit 220. It should be understood that indeed the person may hear his own voice through side tone facilities of the handset of the subscriber telephone 14.

At the beginning of the framing interval, the port time slot counter 294 is reset. All time slots up to 199 produce a corresponding number of conference port memory readouts of digital low signals which are sequentially coupled through the multiplexer 304 to reset the 8-bit input register 280. Accordingly, 8-bit words having all zeros are output on bus 224 during time slots 0-199. During time slot 200, the conference port RAM 298 is read and outputs a logic high signal. The logic high signal appears on reset line 292 and thus does not reset the 8-bit input register 280. Accordingly, the 8-bit voice word associated with time slot 200 is latched into the input 8-bit register 280 and presented on bus 284 as one half of the 16-bit address to the memory 282. The 8-bit result register 290, remaining reset, presents low-order address bits to the memory 282 on address input 286. With this 16-bit address, the ROM 282 is read and a particular location of the memory 282 is accessed. At that location there was previously stored the result of the $\mu$-law addition of an 8-bit zero addend with the addend corresponding to the voice word bits on the bus 284. The accessed memory location is read and presented on bus 288 to the 8-bit result register 290. The result is thus stored in the register 290 and is available for adding with the voice words of subsequent time slots to be conferenced.

During time slots 201-299, the conference port RAM 298 is repetitively read and produces output zeros which maintain the 8-bit input register 280 reset. Accordingly, the voice words associated with the time slots 201-299 do not pass through the input register 280 to the memory 282 and thus are not considered by the conference circuit 220. During the time slot periods 201-299, the result register 290 is not reset, whereupon the previous result word still remains on buses 224 and 286. On the occurrence of time slot 300, the conference port RAM 298 is again read and outputs a digital one-bit which was previously stored in the associated memory location. The logic one appearing on the reset lead 292 prevents the input register 280 from being reset, thereby allowing the 8-bit voice word associated with time slot 300 to be presented to the memory 282 on address input bus 284. The new address input to the memory 282 on bus 284, together with the previous result voice word on the other address input 286 are presented to the memory 282. The word adder memory 282 is then read and the data contained at the accessed location is output on bus 288. The output comprises a nonlinear result of two $\mu$-law voice words, and is latched into the result register 290. The output bus 224 then holds the result of the summation steps of adding the voice word of time slot 200 and the voice word of time slot 300. At the end of the frame interval, the resultant voice word on bus 224 is transferred to the subscriber instrument interface 214 where it is converted into an analog waveform to derive a voice waveform. During the same framing interval, a sample of the analog waveform from the home port telephone set 14 is digitized and placed into time slot 100 by the inbound port interface 212. The conferees of time slots 200 and 300 would receive such sample, together with the other parties' samples and produce different conference result voice words. Thus, each party of the conference hears only the results of the other parties' voice words.

The summation of data written into the adder ROM 282 contains substantial duplicate or mirror image information. This can be appreciated as the output of the memory 28 must be the same when different addresses are presented on the input buses 284 and 286, and when the addresses are reversed on the buses. Therefore, in practice the memory only need be 32K bytes, although with the current low cost of memory, a full matrix of 64K bytes is considered preferable to the alternate approach which would also require some form of multiplexing to mirror the memory usage correctly. It should also be appreciated that all audio digital words are processed through the memory 282 before being transferred to the subscriber interface 214. To that end, digital words representative of the call progress tones are also presented to the address input of the memory 282 but appropriate programming of the conference port RAM 298. Although the adder memory 282 is programmed with $\mu$-law encoded summation results, the tone digital words pass therethrough as they are added to a null digital word, and thus remain unchanged.

It can be appreciated that with this conferencing arrangement, any number of conferees can participate in a single conference call, each partys' conference circuit generating resultant voice words on a per frame basis. In addition, any number of different conferences can be simultaneously carried on by the system. Indeed, it is even possible for one party to participate in two different conferences, although this situation has a low degree of practicality.

Exemplary System Conferencing Operation

Figure 12:
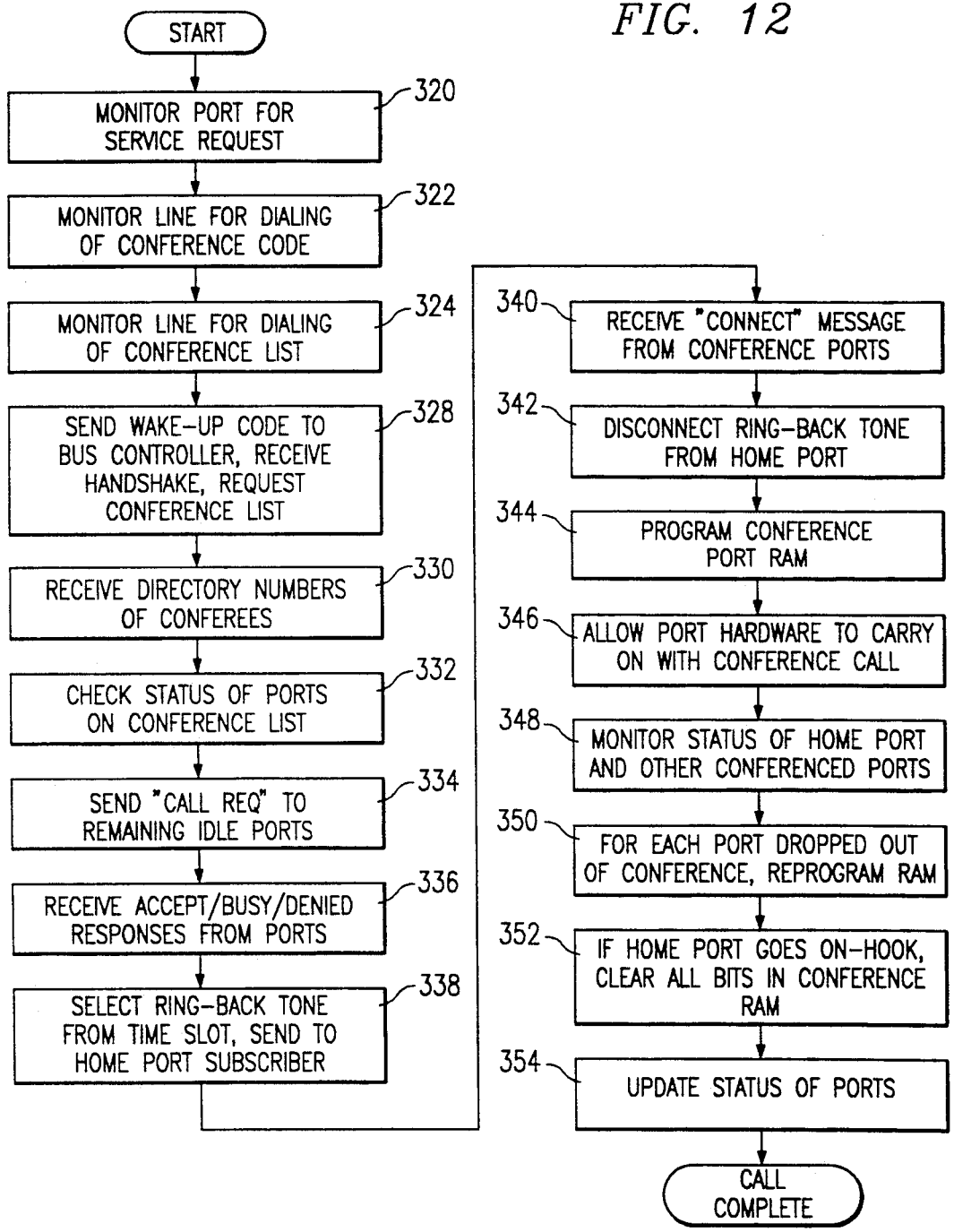
FIG. 12 is a flow chart of the operations carried out by a user port in establishing and carrying out a multiport conference.

Having set forth the basic operating principles of the conference circuit 220, the generalized system operation of a conference telephone call will next be described. Reference is made to FIG. 12 in conjunction with FIG. 8. The flow chart illustrates the steps carried out by the processor and hardware of each port, it being realized that call processing control is distributed amongst each of the ports and no central call processing function of the communication system 10 exists. The flow chart of FIG. 12 illustrates as step 320 those microprocessor programmed instructions which control the subscriber instrument interface 214 so as to monitor the subscriber instrument 14 for any request for service. In the case of a telephone subscriber set 14, an off-hook condition is sensed by the subscriber interface 214 as a request for service. An indication thereof is transferred to the microprocessor circuits 216 for further processing. In response to the request for service, and as noted by step 322, the subscriber instrument interface 214 monitors DTMF tones or dial pulses on the telephone line for the input of a conference code. The dialed digits received by the interface 214 are transferred in digit form to the microprocessor circuits 216 to determine the nature of the request for service. The communication system 10 of the invention is adapted for providing full telecommunication services, including requests for two-way telephone calls, both locally and long distance, conferencing calls, voice and data calls by way of an ISDN network, data transmission by modems and the like, incoming and outgoing toll calls, call restriction, etc. Such features and functions can be programmed with respect to each user port 12 according to the function desired.

In the event a conference access code is dialed and detected by the microprocessor circuits 216, then the microprocessor 216 waits further for the input of a conference list number, as noted by step 324. The setting up of a conference call may be carried out according to different protocols, although the foregoing is believed to be preferable. In other words, a large conference call of, for example, 50–150 conferees, can be set up by inputting into the home user port 12 a special conference access code, followed by a conference list number. The list number may be a two-digit number, associated with a predefined list of directory numbers to participate in the conference call. Next, step 328 shows that the microprocessor is programmed to transmit a wake-up bus cycle to the master bus controller in the time slot of the home port. In addition, the address of the bus controller is also included in the home port time slot, as noted by the wake-up bus cycle shown in FIG. 2. The port microprocessor 216 will then wait for a handshake signal from the bus controller 34 to confirm a communication path therebetween by way of the respective time slots. The microprocessor of the home user port then sends a message, requesting from the bus controller, the downloading of the conference list identified by the digits dialed by the user. Step 330 illustrates that a message is returned by a similar (wake-up, etc.) technique, in which the bus controller 34 transmits in time slot 5 the data comprising the directory numbers of the requested conference list. In other words, the directory numbers of the 50 conferees would be downloaded to the home user port. The microprocessor circuits 216 of the home user port 12 can then translate the directory numbers by use of its copy of the directory tables to time slots for determining all the other conferees to be participants in the requested conference.

Next, a status check is conducted of the other user ports to determine the general availability thereof. If at least some of the user ports on the conference list are idle, then the microprocessor circuits 216 cause a "call request" to be dispatched to all of the idle ports to be conferenced. This is shown in step 334. The call request is initiated by the home port microprocessor 216 to all the idle ports to be conferenced. When an accept, busy or denied status is received from the ports to be conferenced, as noted by step 336, a ringback tone is sent to the subscriber of the home user port. Such a tone is sent by retrieving from the appropriate tone time slot 6–31, the ringback tone and transferring the samples through the conference port 220 to the subscriber instrument interface 214. This step is generally shown as numeral 338. As depicted in step 340, the microprocessor 216 in the home user port 12 waits for a "connect" message from each of the conferees that are available, i.e., those in which the accept message has been received. The ringback tone is then disconnected from the telephone subscriber set 14 (step 342).

Upon receiving a "connect" message from each conference, the conference port RAM 298 is programmed with a logic one in those time slots corresponding to the user ports to participate in the conference. In all other memory locations corresponding to time slots of parties not to participate, or not yet connected, including the home user port, logic zeros are programmed. This step is shown as reference character 344. Once the conference port RAM 298 is programmed, the high speed hardware of the home user port 12 selects the voice words of each of the ports to be conferenced, and presents the same, one at a time, on bus 222 to the conference circuit 220. At the end of each bus cycle, a composite voice word derived from all the present conferees is transferred to the telephone set 14 of the home user port on internal bus 224. On the other hand, audio sounds input into the telephone set 14 are digitized and transferred on internal bus 226 for output by the home user port. All other ports carry on substantially the same activity.

Also, during the actual telephone conference, the microprocessor 216 is not actively involved in the transferral of voice words. Rather, such activity is handled by the high speed port hardware circuits. Step 346 of the flow chart of FIG. 12 illustrates the major part of the telephone conferencing, namely the actual carrying on of the conversations after the initial setup. Concurrent with the conferencing of step 346, the microprocessor 216 monitors the status of the home port, as well as that of the other conferenced ports (step 348). It may occur that during the conference telephone conversation, one or more other user ports may go on-hook. According to step 350 of the flow chart, each conferenced user port that is dropped during the conference is sensed by the microprocessor 216, whereupon the conference port RAM 298 is reprogrammed to write a logic zero digit in the locations associated with the dropped time slots. Thus, the voice words, noise, etc. of such time slots is prevented from entering the conference circuit 220. As noted by program step 352, if the home user port goes on-hook, the microprocessor 216 rewrites the conference port RAM 298 with all zeros, thereby effectively terminating the conference as to the home user port. It should be realized that the other ports may remain in the conference, even though the home user port initiated the conference call.

The foregoing sets forth the major steps and operations in carrying out communications involving audio or voice signals. However, data bus cycles can be invoked in which data words can be transmitted in allocated time slots between subscriber instruments capable of transmitting and receiving data.

In accordance with another feature of the invention, digital control information can be exchanged between ports to achieve radio communications using push-to-talk transmission equipment. Special control features, such as the push-to-talk (PTT) control with PTT arbitration on a first-come, first-served basis are handled similar to the setting up of a call, as described above. The user ports which are conferenced to a PTT driven port (such as a port for controlling radio transmitters) vie for control of the user port by transmitting on the collection bus a PTT status control bit, along with the voice samples. The user port connected to a PTT radio is capable of transmitting in the appropriate status bit time slot a status condition indicating when the PTT transmitter button is pressed, as well as status indicating when the PTT transmitter button is released. The exchange of control information between the various ports involved in a radio conference or simple two-way conversation prevents two persons from using the same frequency at the same time. Essentially, prior to capturing a PTT channel, if one of the message bits is set, then a second user cannot use the frequency, as it is already in use, as noted by the status bit. The speed of response obtained by this technique is a decided advantage over prior art techniques, in which 2600 Hz or similar tones are employed to signal the assertion of the PTT action. In digital switching equipment, the transmission of information by means of tones is extremely inefficient, and the detection thereof is extremely slow, compared to the results obtained by digital techniques. Some applications, such as Air Traffic Control, demand very fast PTT response times.

With the PTT features of the invention, the first PTT received by the PTT-driven port is answered by the called port with an "acceptance" message. That port's voice samples are accepted by the PTT-driven port as long as the successfully contending port PTT control bit is sent. Unsuccessful ports receive a "denied" message and thence generate their own "PTT denied" actions.

System Architectures

Figure 13:
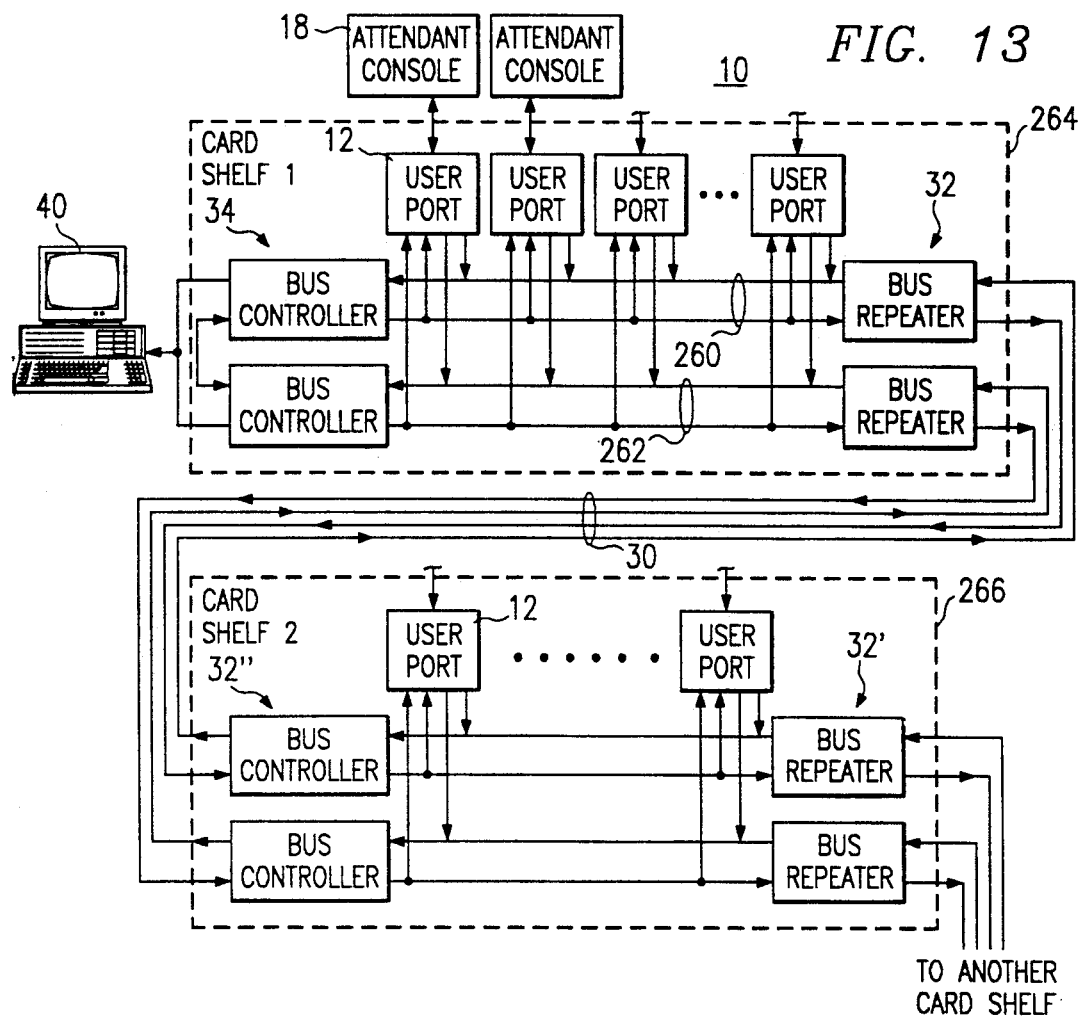
FIGS. 13 and 14 are diagrams illustrating other embodiments of a communication system of the invention.
Figure 14:
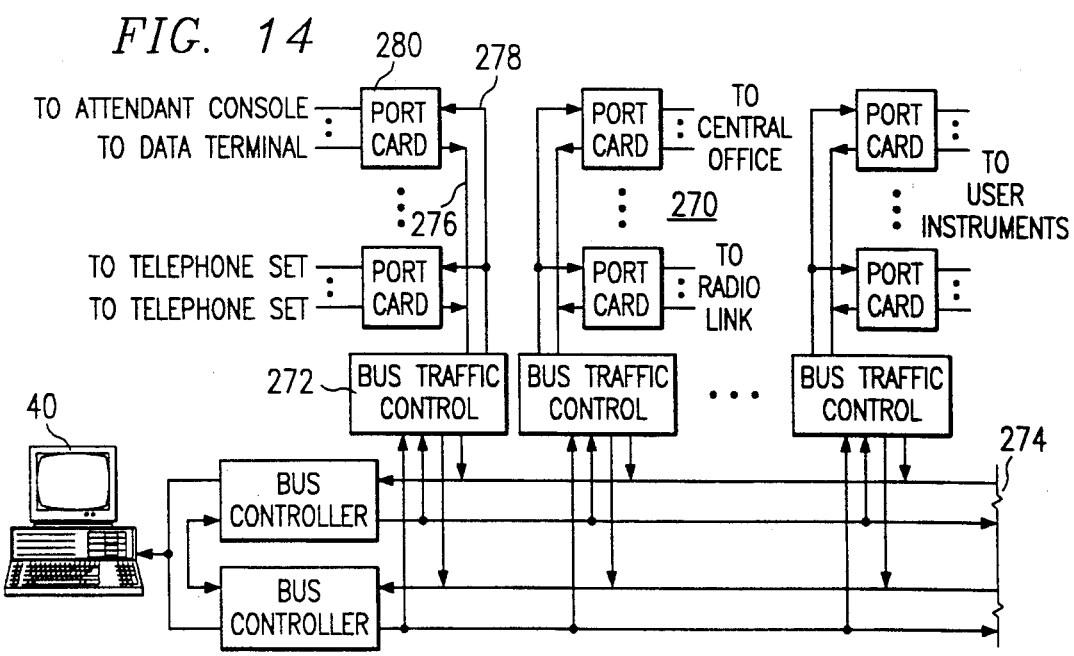

FIGS. 13 and 14 depict different architectures in which the principles and concepts of the invention can be embodied. Other architectures employing the invention may be readily adapted by those skilled in the art. With specific reference to FIG. 13, there is illustrated a communication system architecture employing the user port and bus controller architecture of the system 10 described above. The communication system 10 includes the user ports 12 connected to user instruments such as attendant consoles 18. Further included are duplicated TDM buses 260 and 262 connected by duplicated bus controllers 34. A number of user ports 12 and duplicated bus controllers 34 are assembled on printed circuit boards and inserted into a card shelf 264. The card shelf includes a connectorized backplane having parallel conductors defining the duplicated TDM buses 260 and 262. Such a system is operable within itself, together with power supplies and other support circuits, to provide communication services. The user ports 12 can be custom designed to provide interface circuits between the attendant consoles 18, telephone sets, central office switching equipment, radio equipment, etc. Moreover, the card shelf 264 includes a slot for duplicated bus repeaters 32 for extending the duplicated TDM buses 260 and 262 in series to another card shelf 266, by way of a multi-conductor interconnecting ribbon cable 30. The second card shelf 266 can be fabricated substantially identical to the first card shelf 264, and includes user ports 12, other bus repeaters 32", and yet another bus repeater 32, for continuing the TDM bus to yet other card shelves.

By employing 1024 time slots in the TDM buses, 1000 time slots, and thus user ports, can be utilized with user instruments or equipment. Fifty card shelves, each housing twenty user port cards, with one port circuit per card, define a communication system 10 adapted for serving 1000 user instruments or equipment. The remaining 24 time slots are employed by the system 10 as signaling and tone channels for providing intra-system communication. Such a system can employ bus controllers 34 generating bus clock speeds of 8.192 MHz, one audio sample per time slot, and a TDM bus width of twenty-seven conductors, fourteen of which are used in a manner noted by FIG. 2, three other conductors for the clock, frame and frame index timing signals, and ten other conductors employed exclusively for internal data messages between the user ports of the communication system 10.

In the alternative, each TDM collection and distribution bus has 27 conductors to accommodate both voice and data simultaneously. In such alternate embodiment, fewer time slots are required for internal system overhead and thus a thousand time slots can be dedicated to serving user instruments or equipment. This alternative includes only one user port per circuit card for use in extremely high reliability applications, wherein attempts to board-swap port circuits of users experiencing difficulty do not impact other users.

In yet another embodiment of FIG. 13, the width of each TDM bus is doubled, in that more parallel bus conductors are employed, but the bus speed remains the same, namely 8.192 MHz. By doubling the number of conductors in the TDM buses, 2048 time slots are available, thereby supporting a maximum of 2,000 user ports. In this instance, there would be one user port per card, and two audio samples per time slot, the duplicated buses each having one time slot per time slot interval. The doubling of the bus conductors results in each TDM collection and distribution bus having 46 conductors. Of the 46 conductors, ccarry information similar to the 27-conductor bus noted above, as well as eight conductors for carrying additional audio samples and 11 conductors for carrying digital address information of the extended bus width.

FIG. 14 illustrates a communication system 270 which is yet another alternative embodiment of the invention. In this embodiment, the communication system 270 includes a TDM bus width of seventeen conductors, fourteen of which are used in a manner noted in FIG. 2, and three other conductors for the clock, frame and frame index timing signals. Also included are accompanying bus controllers and repeaters, in addition to bus traffic controllers 272 which connect to the duplicated TDM buses 274 and provide a pair of unidirectional output buses 276 and 278 connected to plural user ports, one shown as reference character 280. A number of such bus traffic controllers 272 provide unidirectional pairs to a number of other user ports, sufficient to accommodate the number of time slots of the TDM bus 274.

The bus traffic controllers 272 have nonintelligent circuits which function to transfer voice samples in time slots on the unidirectional bus 278 to the duplicated collection buses of the TDM bus 274. In like manner, the bus controller 272 includes circuits for retrieving time slot samples from the duplicated distribution buses of the TDM bus 274 and driving the unidirectional bus 276. In this manner, each user port 280 can transmit and receive samples, status bits, parity, timing signals, etc. with respect to the duplicated TDM system bus 274. Each bus traffic controller 272 can support up to four port cards 280, with each port card having a total of 8 user ports. The port cards 280 can be fabricated in numerous varieties and may be mixed and matched in any combination as desired to service the user instruments.

From the foregoing, disclosed is a communication system which can accommodate a large number of users in a non-blocking manner, without the need for central call processing capabilities or a switching network. Instead, the communication system of the invention includes a number of substantially identical user ports, individually programmed for call processing capabilities, all connected to a time division multiplex bus system. A technical advantage of the invention is the simplified structure of the entire communication system itself as well as the universality of the user ports, each of which have a dedicated time slot on the TDM bus. Another technical advantage is the conferencing technique for summing voice words of an unlimited number of ports. Yet another technical advantage of the conferencing system is that irrespective of the number of conferees the quality is not degraded, and there exists no complicated technique for summing the voice words to be conferenced. Another technical advantage of the invention is the bus arrangement includes collection and distribution branches connected together by a bus controller for providing highly accurate timing signals for each bus.

While the preferred and other embodiments of the invention have been disclosed with reference to a specific communication and conferencing system and method, it is to be understood that many changes in detail may be made as a matter of engineering choices without departing from the spirit and scope of the invention, as defined by the appended claims.

What is claimed is:

1. A digital conference circuit arrangement for combining audio information from plural sources, comprising:

a plurality of user ports each adapted to transmit and receive audio signals from sound reproducing apparatus, each said user port including a digital word combining circuit for summing plural digital words to achieve a composite digital word;

a common TDM bus for interconnecting each user port, said TDM bus including a time slot assigned to each user port, ones of said time slots carrying digital words representative of audio signals, and address information identifying the user ports; and each said user port including a processor and programmable support circuits, said processor being programmed to establish a conference by transmitting on the TDM bus on an assigned time slot addresses of all the other ports to participate in the conference, and in response to an acknowledgement received in other time slots of the TDM bus, said process programs said support circuits with time slot information so that digital words of the other ports participating in the conference are coupled to said digital word combining circuit to achieve said composite digital words, and said support circuits converting the composite digital words to audio sounds and coupling the audio sounds to the sound reproducing apparatus.

2. The conference circuit of claim 1, further including a circuit in each user port for comparing address bits carried by said TDM bus with other digital bits identifying that port, and on a match thereof, identifying the time slot carrying the matched address to determine another user port desiring to establish a conference.

3. The conference circuit of claim 1, wherein said TDM bus includes a collection bus for receiving voice words from each user port, and a distribution bus for transferring voice words to each user port.

4. The conference circuit of claim 3, further including a circuit connecting the collection bus to the distribution bus to resynchronize the time slots.

5. The conference circuit of claim 1, wherein said TDM bus has a time slot dedicated to each user port.

6. The conference circuit of claim 1, further including a circuit for storing data representative of summations of substantially all combinations of digital word combinations to be combined.

7. The conference circuit of claim 6, further including in each user port a register for successively storing a composite of plural digital words in a frame interval.

8. The conference circuit of claim 7, further including a circuit for appending to an output of said register another digital word, the appended combination defining an address for accessing a memory which stores the summation data.

9. The conference circuit of claim 1, further including a bit carried by said TDM bus for defining the transmission of nonvoice data, and means for the digital word circuit when said bit is carried by the TDM bus.

10. The conference circuit of claim 1, wherein said TDM bus includes a TDM collection bus and a TDM distribution bus, and further includes a U-turn repeater having an input connected to the collection bus and an output connected to the distribution bus for regenerating bits.

11. The conference circuit of claim 1, wherein said TDM bus has time slots in excess of the number of user ports, said excess time slots being adapted for carrying data to a bus control circuit which controls timing of the TDM bus.

12. The conference circuit of claim 11, further including means for inserting programming data in said excess time slots and for downloading data to each user port.

13. The conference circuit of claim 11, further including means for inserting data representative of call progress tones in said excess time slots.

14. The conference circuit of claim 1, wherein said digital word combining circuit is adapted to combine a null data word with data words of a single time slot during a two-way conversation.

15. The conference circuit of claim 6, wherein said digital word combining circuit adds nonlinear digital words and provides a corresponding nonlinear composite digital word.

16. The conference circuit of claim 1, wherein said digital words comprise voice signals converted to multibit words.

17. The conference circuit of claim 1, wherein digital words representative of tones are processed by the combining circuit and added with null digital words to pass tone digital words substantially unchanged.

18. The conference circuit of claim 1, further including a memory which is programmable with data associated with each time slot, and means for reading the memory in synchronization with the TDM bus time slots, an output of the memory controlling whether or not data words of each time slot are to be combined by said combining circuit.

19. The conference circuit of claim 1, further including in each port, means for preventing the digital words generated by that port from being combined with digital words of other ports by the combining circuit of that port.

20. The conference circuit of claim 1, wherein said TDM bus includes bit positions in each time slot for identifying different bus cycles, one cycle being utilized in initiating a conference, wherein other bits of the time slot include address information of the ports to be involved in the conference.

21. The conference circuit of claim 20, wherein each said port includes a circuit responsive to a bus cycle having address information for matching such address information with port identity information, and on a match, transmitting on a TDM bus time slot data corresponding to an acknowledgement.

22. The conference circuit of claim 20, wherein one said bus cycle which includes the transmission of address information precedes a bus cycle in which digital words are transmitted in the respective TDM bus time slots.

23. The conference circuit of claim 1, wherein each said process includes a table in which the other ports are uniquely associated with respective time slots.

24. The conference circuit of claim 1, wherein each said processor includes a status table in which data is stored corresponding to an operating status of each port.

25. The conference circuit of claim 1, wherein time slot bits of the TDM bus carry status information of each said port.

26. In a digital telecommunication system, a method for conferencing a plurality of digital signals representative of voice communications, comprising the steps of:
providing a memory having stored therein summation results of bits defined by signals applied to address inputs thereof;
(a) selecting from a TDM bus a digital word defining a portion of an audio sound to be conferenced;
(b) coupling the digital word to an address input of the memory for use in reading the memory;
(c) temporarily storing memory readout data;
(d) using the memory readout data together with a subsequent digital word selected from the TDM bus for accessing the memory to derive a summation signal; and
(e) carrying out steps (a) through (d) for digital words received on the TDM bus in selected TDM bus time slots to define a final summation signal which is a composite of the digital words to be conferenced in a TDM frame interval.

27. The method of claim 26, further including combining an initial digital word of M-bits with a subsequent digital word of N-bits by appending the M-bit word with the N-bit word to define an address with M+N bits.

28. The method of claim 26, further including storing the final summation signal and feeding said final summation signal back to an input of the memory.

29. The method of claim 26, further including adding the digital words together by accessing the memory with the words and reading out the summation digital signal.

30. The method of claim 26, further including converting the final summation signal of said memory once during each frame interval to an analog signal for use in driving sound reproducing equipment using the analog signal.

31. The method of claim 26, wherein said memory defines a first memory, and further including storing in a second memory digital bits indicating whether or not digital words of the time slots are to be used in accessing the first memory.

32. The method of claim 31, further including reading the second memory in synchronization with the TDM bus time slots and using the output of the second memory for allowing digital words from the time slots to be used in accessing the first memory, and preventing the digital words from the time slots not to be conferenced from being used in accessing the first memory.

33. The method of claim 26, further including carrying out said conferencing steps in each of a plurality of user ports connected to the TDM bus and participating in a conference.

34. The method of claim 33, further including setting up a conference by defining which time slots are conference participants by using a microprocessor in each user port, and carrying out the conferencing steps with high speed circuit without the microprocessor.

35. The method of claim 26, further including storing the summation signal in a register, and resetting the register so that at the beginning of the specified frame interval, the summation signal used with the initial digital word is a null value.

36. A telecommunication conference circuit for combining voice information from plural sources, comprising:
   at least a pair of user port circuits adapted to communicate audio signals with respective audio sound apparatus;
   a TDM bus arrangement interconnecting each said user port, said TDM bus arrangement including duplicated TDM collection buses on which each user port transmits in respective dedicated time slots digital voice words, and duplicated TDM distribution buses on which each user port receives in respective dedicated time slots digital voice words;
   controller circuits for controlling the duplicated TDM distribution and collection buses, said controller circuits functioning to maintain one TDM distribution bus active and one in a stand-by status, and to maintain one TDM collection bus active and one in a stand-by status, said user ports, transmitting digital voice words on each TDM collection bus and receiving digital voice words from each TDM distribution bus;
   each user port including circuits for initiating a conference and setting up a conference by driving a duplicated TDM collection bus time slot with address information identifying another user port with which a conference connection is to be established, circuits for receiving acknowledgement information on other time slots of the duplicated TDM distribution buses from other user ports, a bus driver circuit for driving the duplicated TDM collection buses during a respective dedicated time slot with digital voice words representative of audio sounds, a bus receiver for receiving digital voice words of other conferenced ports from the duplicated TDM distribution buses, a circuit for specifying the time slots of the duplicated TDM distribution buses which are associated with user ports participating in a conference, a digital combiner for receiving digital voice words only from other user ports participating in the conference and for combining said digital voice words into a composite word for transferral to the audio sound apparatus.

37. The conference circuit of claim 36, further including in each user port means for converting audio sounds input into each user port to corresponding digital voice words and and for transmitting the digital voice words on the TDM collection bus, and means for combining voice words received from the TDM distribution bus such that the combining of voice words in a port does not include voice words generated by that port.

38. The conference circuit of claim 36, wherein said digital combiner comprises a memory storing a summation result of each combination of digital voice words which can be generated by the user ports.

39. The conference circuit of claim 38, wherein said memory stores summations of digital voice words encoded according to a nonlinear format.

40. The conference circuit of claim 36, further including a bus controller common to all user ports for providing timing signals for the duplicated TDM collection buses and the duplicated TDM distribution buses.

41. The conference circuit of claim 40, wherein said bus controller includes a circuit for receiving digital voice words in time slots on the TDM collection bus and for resynchronizing the digital voice words and driving the TDM distribution bus with resynchronized digital voice words.

42. The conference circuit of claim 36, further including duplicated controller circuits, one controller circuit for controlling one TDM distribution bus and one TDM collection bus, and another controller circuit for controlling the other TDM distribution bus and the other TDM collection bus.

43. A digital conferencing circuit for use in a time division multiplex (TDM) system, comprising:
   a combining memory having prestored therein summation results of signals presented to an input of the memory, said combining memory receiving addresses from the TDM system on an input of the memory;
   a result register having an input for receiving summation data output from the memory, an output of said result register being used as an input coupled back to said combining memory; and
   a time slot memory storing data associated with each time slot of the TDM system for indicating whether or not a voice word associated with each time slot is to be combined with another voice word, an output of said time slot memory being used to prevent said combining memory from responding to the voice words from the TDM system when said output of said time slot memory comprises a first indication, and to allow combining of the voice words when the time slot memory output comprises a second indication.

44. The digital conferencing circuit of claim 43, further including an input register for latching said voice words therein before being input as addresses to the combining memory.

45. The digital conferencing circuit of claim 44, wherein the output of the time slot memory is used to control the transfer of voice words from the input register to the combining memory.

46. The digital conferencing circuit of claim 45 wherein the time slot memory includes means for forcing the input register to produce an output representative of an analog zero signal.

47. A method for conferencing digitized signals in a time division multiplex (TDM) system, comprising the steps of:
   writing a time slot memory with data indicating whether or not various time slots of the TDM system are to participate in a conference;
   presenting the digital signals of all TDM time slots to a combining circuit;
   reading the time slot memory in synchronization with TDM time slots to derive a memory output; and
   controlling the combining circuit with the time slot memory output to combine digital signals of respective time slots when the time slot memory output for the associated time slots comprise a first indication, and preventing the combining of digital signals when the time slot memory output comprises a second indication.

48. The method of claim 47, further including writing the time slot memory with a single digital bit for all time slots, the logic state of the bit indicating whether or not digital signals of the respective time slots are to be combined.

49. The method of claim 47, further including combining digital signals by adding together those digital signals to be conferenced.

50. The method of claim 49, further including adding digital signals which are encoded in a nonlinear manner.

51. The method of claim 47, further including presenting two digital signals to be combined as a composite address to a combining memory, the readout of which is a resultant digital word.

52. The method of claim 51, further including presenting the resultant memory readout to an input of the combining memory together with another digital audio signal from the TDM system to define a subsequent composite memory address, and addressing the combining memory to derive yet another resultant memory readout.

53. The method of claim 52, further including repeating the memory addressing for an entire frame period and using a last resultant memory readout for use in converting to an analog signal.

54. The method of claim 47, further including controlling the combining circuit by sequentially inputting the digital signals of each time slot into a register, and if the digital signal is not to be combined, using the time slot memory output to force the register to produce an output representative of an analog zero signal.

55. In a telecommunication system, a user port for carrying out communications with other similar ports via a TDM bus, comprising:
- a bus interface for communicating digital signals with the TDM bus;
- a user instrument interface for communicating audio signal with audio transducers;
- converting means in said user instrument interface for converting digital signals to analog signals, and vice versa;
- an identity uniquely associated with the user port;
- a conference memory;
- a processor programmed to:
  a) initialize high speed hardware circuits to retrieve digital signals from the TDM bus during time slots;
  b) select those digital signals associated with the time slots which are to participate in the conference;
  c) cause a series of memory addresses to be derived based on the selected digital signals for the conference time slot participants;
  d) cause the conference memory to be accessed with said derived memory addresses to produce a composite readout comprising an addition of each of the selected digital signals; and
- means for transferring the composite readout to said converting means in said user instrument interface so that said composite readout can be converted to an analog signal.

56. The user port of claim 55, further including a register for temporarily storing the composite readout, and means for combining the composite readout with subsequent digital signals retrieved from the TDM bus to generate the memory addresses.

57. The user port of claim 56, wherein said hardware circuits include means for sequentially generating memory readouts during a frame of time slots, and for each frame said hardware circuits generate a single composite readout which is converted to an analog signal.

58. The user port of claim 55, further including a counter for counting time slots with respect to a reference, the counter output identifying user ports connected to the TDM bus.

59. The user port of claim 58, further including means for resetting the counter with a reference frame signal which precedes each group of time slots.

60. The user port of claim 55, further including a hardware circuit responsive to a request for service of another user port for driving said TDM bus with a status word and an address of the user port to which communications are desired.

61. The user port of claim 60, further including a circuit responsive to a control status word on said TDM bus for signifying user port acceptance of communication with another user port.

62. The user port of claim 55, wherein said bus interface includes an outbound interface for receiving digital signals on a TDM distribution bus, and an inbound interface for transmitting digital signals on a TDM collection bus.

63. A telecommunication system, comprising:
- a time division multiplex (TDM) bus for carrying voice words between subscribers associated with the system;
- at least three user ports connected to the telecommunication system so as to be able to communicate voice words via the TDM bus, and each said port being dedicated for use with a single subscriber;
- a conference circuit in each said user port for combining voice words and for transferring corresponding analog signals to a user associated with the respective ports, one said conference circuit being dedicated for use with each said port; and
- a processor in each said user port for controlling the conference circuit to pass voice words therethrough substantially unchanged in a two-way telephone conference and to combine voice words in said conference circuit to produce different resultant voice words in a conference call involving three or more user ports.

64. The communication system of claim 63, wherein said TDM bus includes time slots carrying tones, and wherein said processor controls said conference circuit to pass digital signals therethrough representative of the tones.

65. The communication system of claim 63, wherein said TDM bus includes time slots for carrying voice words, and said conference circuit is connected so that all voice words transferred from said TDM bus to the user ports pass through a respective said conference circuit.

66. The communication system of claim 63, wherein said conference circuit includes a memory in which voice words are utilized to access said memory during conference and non-conference calls to derive other voice words communicated to users of the respective port.

67. A communication system, comprising:
- a plurality of user ports serving a plurality of user instruments;
- a time division multiplex (TDM) bus connected to each user port, a different time slot of said TDM bus being dedicated to each user port for communicating digital words, whereby a user port always communicates digital words on the same time slot;
- a bus timing circuit for providing timing signals to each user port to provide synchronization of each user port to a respective bus time slot;
- each user port including;

a bus interface for communicating high speed digital words to and from the TDM bus;

high speed hardware circuits for receiving and transmitting digital words with respect to said user port;

a user instrument interface providing an interface between the user port and an associated subscriber instrument; and a processor programmed to initialize said hardware circuits for communicating high speed digital words between said bus interface and said user instrument interface, and to monitor status indications of the user instrument, said processor being programmed to respond to requests for service from an instrument connected to the port for communicating with another port by way of the TDM bus to establish a call path, to carry on bidirectional communications between users using the TDM bus, and to terminate the communication by signalling between the respective user ports using the TDM bus.

68. The communication system of claim 67, wherein said TDM bus comprises a TDM collection bus for receiving digital words from each user port, and a TDM distribution bus for delivering digital words to each user port.

69. The communication system of claim 68, further including a synchronizing circuit for receiving digital words from the TDM collection bus and retransmitting digital words resynchronized with corresponding time slots on the TDM distribution bus.

70. The communication system of claim 68, wherein said TDM bus includes conductors for carrying digital words in time slots, and further includes conductors carrying time slot timing signals and framing interval signals.

71. The communication system of claim 70, wherein said bus timing circuit includes means for generating a frame timing signal for said TDM distribution bus, delayed from a frame timing signal of said TDM collection bus.

72. The communication system of claim 67, wherein said bus timing circuit includes a bus control circuit for storing call processing program software, and said bus control circuit has assigned thereto a time slot on the TDM bus for communicating with the user ports.

73. The communication system of claim 72, wherein said bus control circuit is processor controlled to initialize communications with the user ports to download the software thereto in the assigned time slot.

74. The communication system of claim 67, wherein said bus timing circuit includes a bus control circuit having digital call progress tone generators, and said TDM bus carries digitized tone signals to each user port.

75. The communication system of claim 67, wherein said TDM bus includes a conductor for carrying status information of each user port in a time slot, and each user port includes a circuit for monitoring the TDM bus status of the other user ports, and each user port includes a software status table for storing the status of the other user ports.

76. The communication system of claim 72, wherein said bus control circuits are duplicated and further including a UART for providing communications therebetween.

77. The communication system of claim 67, wherein said bus timing circuit defines a bus controller, and further including duplicated bus controllers, and a bistable circuit for providing opposite output data states indicating one bus controller as an on-line master and the other bus controller as a standby.

78. In a telecommunication system, a user port for carrying out communications with other similar ports via a TDM bus, said user port comprising:

a bus interface for communicating digital signals with the TDM bus;

a user instrument interface for communicating audio signals with audio transducers;

a converter in said user instrument interface for converting the digital signals to the audio signals, and vice versa;

a processor associated with each said user port and programmed to carry out call processing functions including establishing communications between said user port and said other similar user ports, a memory associated with each said user port and being accessible by a respective said processor, said memory storing busy/idle status indications of each said other similar user ports, said processor being responsive to requests for service from the user instrument interface to complete a call to a destination user port by accessing said memory to determine the status of said destination user port, and if said status indication is busy, said processor returns a busy indication to the user instrument interface, and if said status indication is idle, said processor compels communication via said TDM bus to said destination user port.

79. The user port of claim 78, wherein said TDM bus carries user port status information between each said user port.

80. The user port of claim 78, further including a memory for storing user port identification information for correlating TDM bus time slots with telephone number extension information.

81. The user port of claim 80, wherein said processor is programmed to be responsive to said requests for service for accessing said memory to determine a time slot associated with the destination user port and the status thereof.

82. The user port of claim 78, further including a microprocessor uniquely associated with each said user port for carrying out call processing functions.

83. A communication system, comprising:

a plurality of user ports serving a plurality of user instruments;

duplicated TDM collection buses and duplicated TDM distribution buses defining time division multiplex (TDM) buses connected to each user port, said duplicated TDM collection buses for receiving digital words from each user port, and said duplicated TDM distribution buses for delivering digital words to each user port, and a time slot of said TDM buses being dedicated to each user port for communicating digital words;

a bus timing circuit for providing timing signals to each user port to provide synchronization of each user port to a respective bus time slot; and each user port including, a bus interface for communicating high speed digital words to and from the TDM buses, high speed hardware circuits for receiving and transmitting digital words with respect to said user port, a user instrument interface providing an interface between the user port and an associated subscriber instrument, and a processor programmed to initialize said hardware circuits for communicating high speed digital words between said bus interface and said user instrument interface, and to monitor status indications of the user instrument, said processor being programmed to respond to request for service from an instrument connected to the port for communicating with another port by way of the TDM buses to establish a call path, to carry on bidirectional communications between users using the TDM buses, and to terminate the communication by signalling between the respective user ports using the TDM buses.

84. The communication system of claim 83, further including means for synchronizing the duplicated TDM buses.

85. The communication system of claim 83, further including a pair of bus timing circuits for providing timing signals to the respective ports of the TDM buses.

86. The communication system of claim 85, further including means for maintaining synchronizing of timing signals between said bus timing circuits so that if one timing circuit fails, the other can assume control without loss of bus time slot timing.

* * * * *

UNITED STATES PATENT AND TRADEMARK OFFICE
CERTIFICATE OF CORRECTION

PATENT NO.   :   5,276,678
DATED        :   January 4, 1994
INVENTOR(S)  :   Herbert C. Hendrickson, et al.

It is certified that error appears in the above-identified patent and that said Letters Patent is hereby corrected as shown below:

```
      Col. 28, line 33, change "process" to --processor--.
      Col. 29, line 3, after "for", insert --inhibiting--.
      Col. 29, line 4, before "circuit", insert
--combining--.

Col. 33, line 33, delete "signal", insert --signals--.
      Col. 36, line 30, "compels communication" should be
--completes communications--.
```

Signed and Sealed this

Twenty-ninth Day of November, 1994

Attest:

BRUCE LEHMAN

*Attesting Officer*    *Commissioner of Patents and Trademarks*